United States Patent
Kawaji et al.

(10) Patent No.: US 6,822,417 B2
(45) Date of Patent: Nov. 23, 2004

(54) SYNCHRONOUS RELUCTANCE MOTOR CONTROL DEVICE

(75) Inventors: Mitsuo Kawaji, Kusatsu (JP); Hideo Matsushiro, Kusatsu (JP); Keizo Matsui, Otsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/481,059

(22) PCT Filed: Mar. 20, 2003

(86) PCT No.: PCT/JP03/03419

§ 371 (c)(1),
(2), (4) Date: May 11, 2004

(87) PCT Pub. No.: WO03/081765

PCT Pub. Date: Oct. 2, 2003

(65) Prior Publication Data

US 2004/0201358 A1 Oct. 14, 2004

(30) Foreign Application Priority Data

Mar. 22, 2002 (JP) .................................. 2002-081171

(51) Int. Cl.[7] ............................. H02P 1/24; G05B 11/01
(52) U.S. Cl. ..................... 318/701; 318/700; 318/727; 318/432; 318/434; 318/722
(58) Field of Search ............................... 318/700–722, 318/430–434, 439, 245, 254, 629, 799–809; 363/40

(56) References Cited

U.S. PATENT DOCUMENTS

| | | | | |
|---|---|---|---|---|
| 5,585,709 A | * | 12/1996 | Jansen et al. | 318/807 |
| 5,694,010 A | * | 12/1997 | Oomura et al. | 318/254 |
| 6,153,993 A | * | 11/2000 | Oomura et al. | 318/434 |
| 6,208,109 B1 | * | 3/2001 | Yamai et al. | 318/716 |
| 6,433,506 B1 | * | 8/2002 | Pavlov et al. | 318/804 |
| 6,583,593 B2 | * | 6/2003 | Iijima et al. | 318/254 |
| 6,674,262 B2 | * | 1/2004 | Kitajima et al. | 318/722 |
| 6,768,280 B2 | * | 7/2004 | Kitajima | 318/432 |
| 2002/0097015 A1 | * | 7/2002 | Kitajima et al. | 318/432 |
| 2002/0113569 A1 | * | 8/2002 | Iijima et al. | 318/727 |
| 2003/0001536 A1 | * | 1/2003 | Kitajima | 318/629 |

FOREIGN PATENT DOCUMENTS

| | | |
|---|---|---|
| JP | 10-243699 | 9/1998 |
| JP | 2000-245199 | 9/2000 |
| JP | 2000-358400 | 12/2000 |
| JP | 2001-197774 A | 7/2001 |

* cited by examiner

*Primary Examiner*—Paul Ip
(74) *Attorney, Agent, or Firm*—RatnerPrestia

(57) ABSTRACT

A control apparatus of a synchronous reluctance motor includes a torque current correction unit (16) that generates a torque current command tracing a load torque so as to make the output torque of the motor coincide with the load torque. The control apparatus may further include a position and speed estimation unit (13) that estimates the position and speed based on three phase voltage equation to improve control performance in a voltage saturation state.

21 Claims, 17 Drawing Sheets

SYNCHRONOUS RELUCTANCE MOTOR CONTROL DEVICE

This application is a U.S. National Phase of International Application No. PCT/JP03/03419, filed March 20, 2003, which claims priority to Japanese Application No. 2002-81171 filed March 22, 2002.

TECHNICAL FIELD

The present invention relates to a control apparatus of a synchronous reluctance motor, and more particularly to a control apparatus for driving the motor with estimation of the angle of the rotor without using position sensor.

BACKGROUND ART

A conventional control apparatus of a synchronous reluctance motor is designed to obtain the angle information of a rotor by using a position sensor such as Hall element, resolver or optical encoder. Accordingly, the cost is increased by the portion of the position sensor, and the size of the synchronous reluctance motor is also increased.

As a control apparatus of the synchronous reluctance motor for realizing low cost and small size by omitting position sensors, generally, a control apparatus of the synchronous reluctance motor as shown in FIG. 23 has been known.

In FIG. 23, a main circuit includes an alternating-current power source 1, an AC/DC converter 2 for converting an alternating-current power into a direct-current power, a DC/AC converter 3 for converting a direct-current power into an alternating-current power, and a synchronous reluctance motor 5 driving with the alternating-current power converted by the DC/AC converter 3.

On the other hand, a control circuit includes current detectors 11a and 11b and a motor current detector 12 for detecting the motor current, a position and speed estimation unit 13 for estimating the position and speed of the synchronous reluctance motor, a speed control unit 14 for determining a current command so as to eliminate the speed error between the speed command given from outside and the estimated speed obtained from the position and speed estimation unit 13, a conduction phase distribution unit 15 for distributing the current command obtained from the speed control unit 14 into a torque current component and a field current component, a current control unit 17 for determining the voltage command so as to eliminate the current error of the torque current command and field current command, and the detected motor current, and a conduction distribution unit 18 for distributing the conduction signal into driving elements in the synchronous reluctance motor 5.

FIG. 24 is a sectional view showing a structure of a general synchronous reluctance motor 5. The synchronous reluctance motor 5 is composed of a rotor 8 and a stator 6.

In the control apparatus shown in FIG. 23, the position and speed estimation unit 13 determines the magnetic flux by using the information of the motor current command and voltage command. Next, an α-β magnetic flux angle showing the angle based on the stationary coordinates of this magnetic flux is determined. Further, a d-q axis coordinate phase indicating the phase of this magnetic flux corresponding to the rotational coordinates is set. The d-q axis coordinate phase is subtracted from the α-β axis coordinate angle to obtain an estimated angle. On the basis of this estimated angle, the synchronous reluctance motor 5 is controlled.

Further, the angle is estimated in two methods of low speed angle estimation and high speed angle estimation, and in the boundary of low speed region and high speed region, the angles estimated by two methods are synthesized by gradually changing the rate of the estimated angles to generate an estimated angle. In the low speed region, a current pulse is applied and the angle is obtained from the voltage response.

For example, the synchronous reluctance motor of driving system without using position sensor disclosed in Japanese Laid-open Patent No. 2001-197774 has low pass filter means for applying a low pass function to the voltage command, and weakens the low pass function when the rotor speed increases to eliminate effects of voltage pulse in the boundary region of low and high speed regions and change over the angle estimating methods stably, realizing the control of synchronous reluctance motor free from time delay in high speed region.

In the conventional configuration, however, the control calculation is complicated, and if the voltage control rate of the inverter is over 100% to be in so-called voltage saturation, or if the load fluctuates extremely, it is difficult to estimate the position or speed, and the motor drive control is unstable.

DISCLOSURE OF INVENTION

The invention is intended to solve these problems of the prior art, and it is hence an object of the invention to present a control apparatus of the synchronous reluctance motor building up a robust control structure withstanding voltage saturation and steep load fluctuations.

The motor control apparatus according to the invention is an apparatus for controlling a synchronous reluctance motor by using a reluctance torque caused by at least a change in inductance of the stator winding and a motor current.

In the control apparatus, a current detector detects the motor current flowing in the stator winding of the synchronous motor.

A position and speed estimation unit estimates an induced voltage of the synchronous reluctance motor from the detected value by the current detector and a voltage command which is a command to a voltage to be applied to the stator winding of the synchronous reluctance motor, and estimated rotor position and rotating speed of the synchronous reluctance motor on the basis of the estimated induced voltage.

A speed control unit determines a current command which is a command to a current to be supplied to the stator winding of the synchronous reluctance motor so as to eliminate the error of the estimated rotating speed by the position and speed estimation unit and a target value of the rotating speed given from outside.

A distribution unit distributes the current command from the speed control unit into a torque current command which is a torque current component of the current command and a field current command which is a field current component of the current command, on the basis of a predetermined current phase angle of the synchronous reluctance motor.

A torque current correction unit corrects the torque current command on the basis of the torque current command from the distribution unit and the estimated rotating speed from the position and speed estimation unit, so that a load torque generated by a load element of the synchronous reluctance motor coincides with the output torque of the synchronous reluctance motor.

A current control unit generates a voltage command so as to eliminate the error between the corrected torque current command from the torque current correction unit and the detected motor current from the current detector, and the error between the field current command from the distribution unit and the detected motor current obtained from the current detector.

A conduction distribution unit distributes conduction signals into driving elements in the synchronous reluctance motor on the basis of the voltage command.

The control apparatus of the invention, having such configuration, controls so that the load torque generated by the load element of the synchronous reluctance motor may always coincide with the output torque of the synchronous reluctance motor. As a result, a robust control structure is built up withstanding steep load fluctuations, and torque fluctuations are suppressed, and lower vibration and lower noise are realized.

BEST MODE FOR CARRYING OUT THE INVENTION

Figure 1:
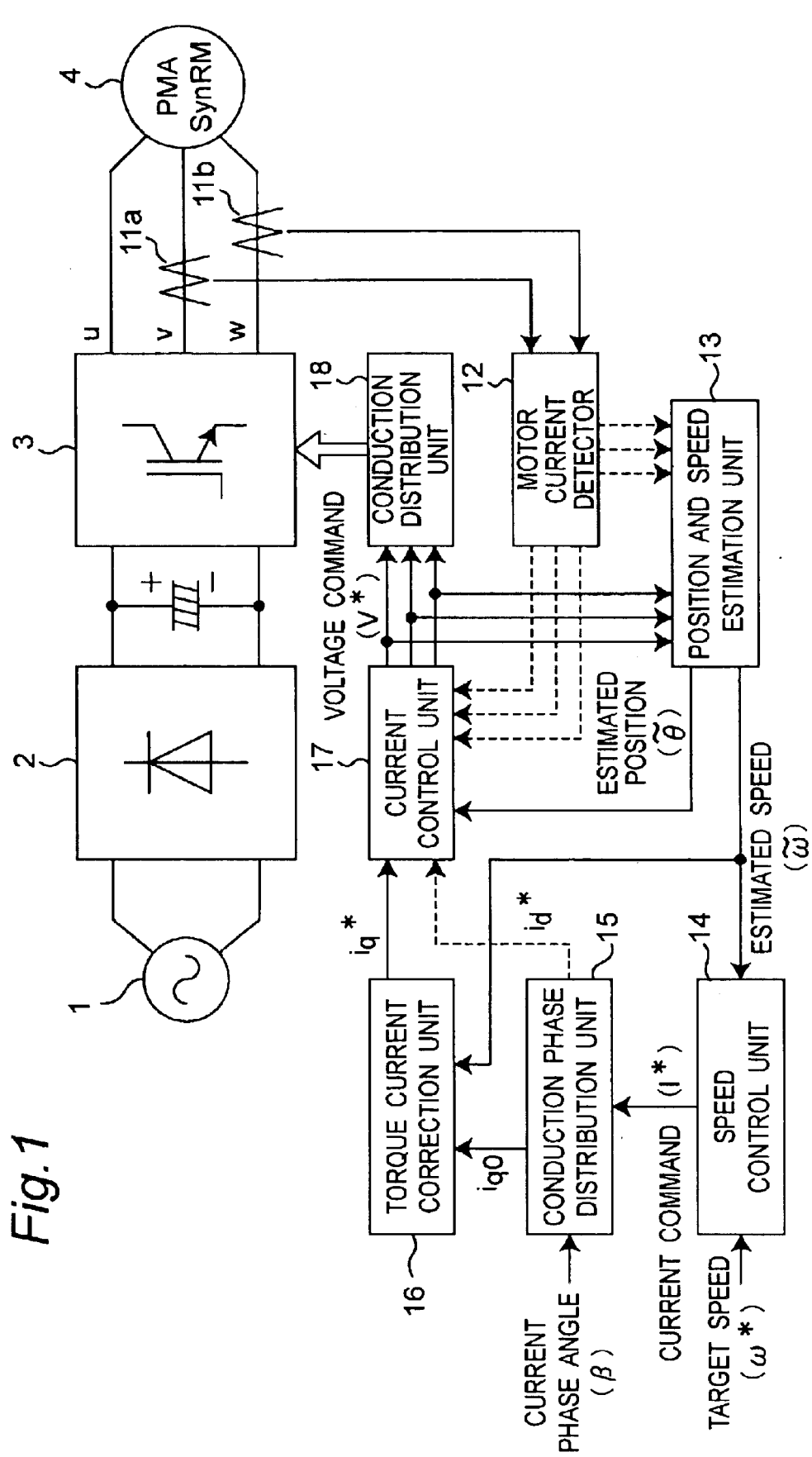
FIG. 1 is a diagram showing an example of an entire configuration of a control apparatus of a synchronous reluctance motor (SRM) according to the invention.

Referring now to the drawings, preferred embodiments of control apparatus of synchronous reluctance motor according to the invention are described below.

Embodiment 1

FIG. 1 is a system block diagram showing an embodiment of a control apparatus of a synchronous reluctance motor according to the invention. An example explained below is a case of sinusoidal drive of an permanent magnet assistance type synchronous reluctance motor by 180-degree conduction without using position sensor.

A main circuit includes an alternating-current power source 1, an AC/DC converter 2 for converting an alternating-current power into a direct-current power, a DC/AC converter 3 for converting a direct-current power into an alternating-current power, and an permanent magnet assistance type synchronous reluctance motor 4 driving with the alternating-current power converted by the DC/AC converter 3.

A control circuit includes current detectors 11a, 11b and motor current detector 12 for detecting the motor current, a position and speed estimation unit 13 for estimating the position and speed of the permanent magnet assistance type synchronous reluctance motor, a speed control unit 14 for determining the current command so as to eliminate the speed error between the speed command given from outside and the estimated speed obtained from the position and speed estimation unit 13, a conduction phase distribution unit 15 for distributing the current command obtained from the speed control unit 14 into a torque current component and a field current component, a torque current correction unit 16 for correcting the torque current command, a current control unit 17 for determining the voltage command so as to eliminate the current error between the corrected torque current command or field current command and detected motor current, and a conduction distribution unit 18 for distributing the conduction signal into driving elements in the permanent magnet assistance type synchronous reluctance motor 4.

Figure 2:
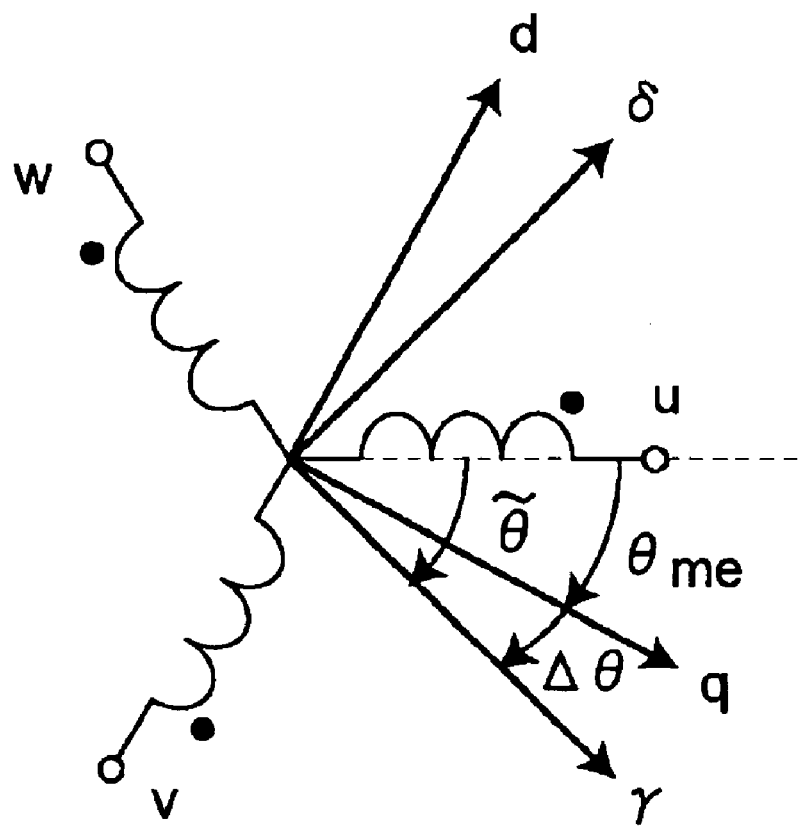
FIG. 2 is an explanatory diagram of an example of a coordinate in position and speed estimation.

FIG. 2 is a diagram of definition of axes of coordinates in position and speed estimation. Generally, in sinusoidal driving, for the ease of control operation, the motor parameters are converted from three phases of u, v and w to two phases of d and q to be in DC status. The converting method from three phases to two phases is well known and thus is not explained here. In FIG. 2, $\theta_{me}$ is actual rotor position (phase difference from q-axis based on u-phase) and $\theta^\sim$ is an estimated position (phase difference from y-axis of u-phase). Position error $\Delta\theta$ is expressed as follows.

$$\Delta\theta = \theta^\sim - \theta_{me}$$

Figure 3:
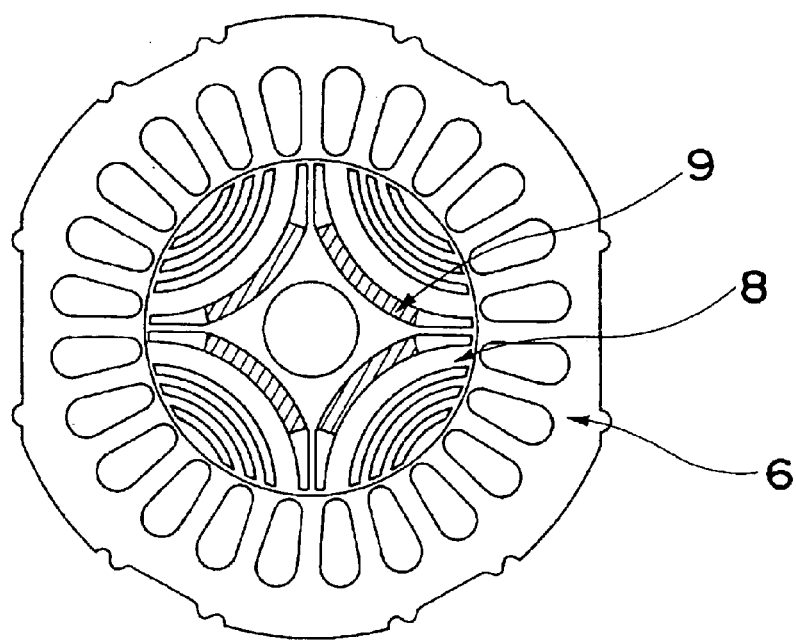
FIG. 3 is a sectional view of one example of an permanent magnet assistance type synchronous reluctance motor according to the invention.
Figure 4:
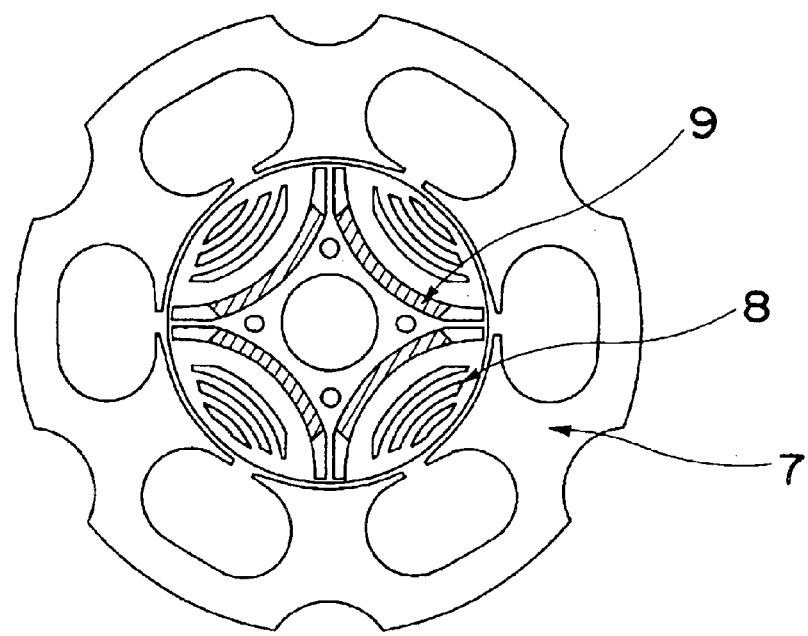
FIG. 4 is a sectional view of the other example of an permanent magnet assistance type synchronous reluctance motor according to the invention.

FIG. 3 and FIG. 4 show examples of structure of permanent magnet assistant type synchronous reluctance motor 4. The synchronous reluctance motor shown in FIG. 3 includes a distributed winding stator 6 and a rotor 8 having a permanent magnet 9. The synchronous reluctance motor shown in FIG. 4 includes a concentrated winding stator 7 and a rotor 8 having a permanent magnet 9. By incorporating a permanent magnet in the rotor, the motor efficiency is enhanced. The permanent magnet 9 is preferred to have a magnetic quantity of a minimum limit only necessary for canceling the brake torque at a rated load of the synchronous reluctance motor. As a result, not only the motor efficiency at a rated load is improved, but also the cost increase due to the permanent magnet is kept to a minimum.

Figure 5:
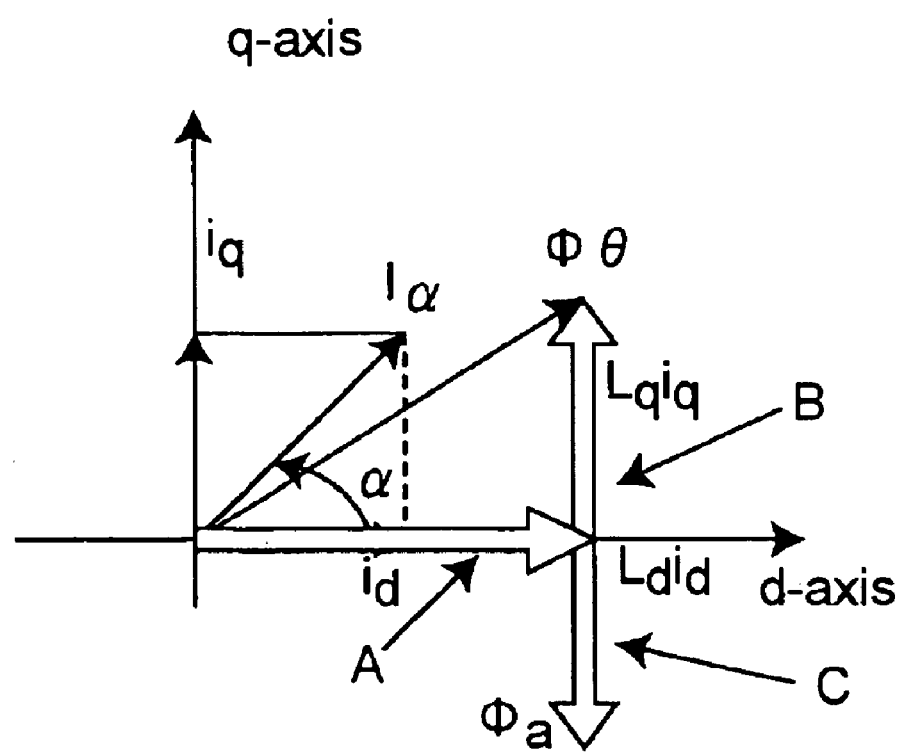
FIG. 5 is a diagram showing an example of magnetic flux vector of an permanent magnet assistance type synchronous reluctance motor according to the invention.

An example of the magnetic flux vector of the permanent magnet assistant type synchronous reluctance motor 4 is shown in FIG. 5. In FIG. 5, the vector A is a magnetic flux component generating a positive torque, and a magnetic flux component (vector C) of assistant magnet acts to cancel a magnetic flux component (vector B) for generating a brake torque (negative torque). In this case, the generated torque is defined in formula (1).

$$\tau_c = n_p L_d i_d i_q = n_p (\Lambda_0 i_q - L_q i_d i_q) \tag{1}$$

where $n_p$ is the number of pole pairs, $L_d$ and $L_q$ are d-axis and q-axis inductances, respectively, $\Lambda_0$ is the number of flux interlinkages by the permanent magnet, and $i_d$ and $i_q$ are d-axis and q-axis current respectively.

Driving of the permanent magnet assistant type synchronous reluctance motor 4 without a position sensor is explained below.

First, the speed control unit 14 determines the current command $I^*$ in the following formula, by using rotating speed command $\omega^*$ given from outside and estimated rotating speed $\omega^{18}$.

$$I^* = \left(K_{P1} + \frac{K_{I1}}{p}\right)(\omega^* - \omega^\sim) \tag{2}$$

where $K_{p1}$, $K_{I1}$ are gains of the PI compensator, and p is a differential operator.

The conduction phase distribution unit 15 distributes the current command $I^*$ into d-axis current $i_d^*$ and q-axis current $i_{q0}$ in the following formula, by using the current command $I^*$ and predetermined current phase angle $\beta$.

$$\begin{cases} i_d^* = -I^* \sin\beta \\ i_{q0} = I^* \cos\beta \end{cases} \tag{3}$$

The torque current correction unit 16 calculates q-axis current command $i_q^*$ in the following formula, by using the estimated rotating speed $\omega^\sim$ and q-axis current $i_{q0}$.

$$i_q^* = i_{q0} + \left(K_{P2} + \frac{K_{12}}{P}\right)(\omega^\sim[nT_s] - \omega^\sim[(n-1)T_s]) \tag{4}$$

In formula (4), a discrete time system is taken for operation by a microcomputer, in which $nT_s$ is a present sampling time, and $(n-1)T_s$ is a sampling time one cycle before the present sampling time. Further, $K_{p2}$, $K_{I2}$ are gains of the PI compensator. The torque current correction unit 16 obtains the q-axis current command $i_q^*$ by using the formula above, so that the load torque generated by the load element of the permanent magnet assistant type synchronous reluctance motor may always coincide with the output torque of the permanent magnet assistant type synchronous reluctance motor.

The current control unit 17 calculates voltage commands of three phases $v_u^*$, $v_v^*$ and $v_w^*$ in the following formula, by using the motor current detected values $i_u$, $i_v$ and $i_w$, and d-q axis current commands $i_d^*$ and $i_q^*$.

First, as expressed in the formula below, by conversion from three phases into two phases, motor current detected values $i_u$, $i_v$ and $i_w$ are converted into gamma-delta axis current detected values $i_\gamma$, $i_\delta$.

$$\begin{bmatrix} i_\gamma \\ i_\delta \end{bmatrix} = \sqrt{\frac{2}{3}} \begin{bmatrix} \cos\theta^\sim & \cos(\theta^\sim - 2\pi/3) & \cos(\theta^\sim + 2\pi/3) \\ \sin\theta^\sim & \sin(\theta^\sim - 2\pi/3) & \sin(\theta^\sim + 2\pi/3) \end{bmatrix} \begin{bmatrix} i_u \\ i_v \\ i_w \end{bmatrix} \tag{5}$$

Next, using d-q axis current commands $i_d^*$ and $i_q^*$, and gamma-delta axis current detected values $i_\gamma$, $i_\delta$, gamma-delta axis voltage commands $v_\gamma^*$ and $v_\delta^*$ are calculated in formula (6).

$$\begin{cases} v_\gamma^* = \left(K_{P3} + \frac{K_{13}}{p}\right)(i_q^* - i_\gamma) \\ v_\delta^* = \left(K_{P4} + \frac{K_{14}}{p}\right)(i_d^* - i_\delta) \end{cases} \tag{6}$$

where $K_{p3}$, $K_{I3}$, and $K_{p4}$, $K_{I4}$ are gains of the PI compensator.

Finally, as expressed in the formula below, by conversion from two phases into three phases, the gamma-delta axis voltage commands $v_\gamma^*$ and $v_\delta^*$ are converted into voltage commands of three phases $v_u^*$, $v_v^*$ and $v_w^*$.

$$\begin{bmatrix} v_u^* \\ v_v^* \\ v_w^* \end{bmatrix} = \sqrt{\frac{2}{3}} \begin{bmatrix} \cos\theta^\sim & \sin\theta^\sim \\ \cos(\theta^\sim - 2\pi/3) & \sin(\theta^\sim - 2\pi/3) \\ \cos(\theta^\sim + 2\pi/3) & \sin(\theta^\sim + 2\pi/3) \end{bmatrix} \begin{bmatrix} v_\gamma \\ v_\delta \end{bmatrix} \tag{7}$$

Further, the position and speed estimation unit 13 estimates the position and speed in the following method, by using the voltage commands of three phases $v_u^*$, $v_v^*$ and $v_w^*$ and motor current detected values $i_u$, $i_v$ and $i_w$.

Herein, by the three-phase voltage equation, the induced voltage is expressed in formula (8).

$$e_{uvw} = v_{uvw} - R i_{uvw} - pL i_{uvw} \tag{8}$$

In formula (8), the phase voltage, phase current, and induced voltage $v_{uvw}$, $i_{uvw}$, $e_{uvw}$ are three-dimensional vectors, and the stator winding resistance and inductances R and L are expressed in a matrix with three columns and three rows, respectively.

Specifically, by the operation in formula (9), estimated induced voltages $e^\sim_u$, $e^\sim_v$ and $e^\sim_w$ are calculated.

$$\begin{bmatrix} e^\sim_u \\ e^\sim_v \\ e^\sim_w \end{bmatrix} = \begin{bmatrix} v_u^* \\ v_v^* \\ v_w^* \end{bmatrix} - R \begin{bmatrix} i_u \\ i_v \\ i_w \end{bmatrix} + \frac{3}{2}\omega^\sim L_{a0} I^* \begin{bmatrix} \sin(\theta^\sim + \beta) \\ \sin(\theta^\sim + \beta - 2\pi/3) \\ \sin(\theta^\sim + \beta + 2\pi/3) \end{bmatrix} - \tag{9}$$

-continued $$\frac{3}{2}\tilde{\omega} L_{aI} I^* \begin{bmatrix} \sin(\tilde{\theta} - \beta) \\ \sin(\tilde{\theta} - \beta - 2\pi/3) \\ \sin(\tilde{\theta} - \beta + 2\pi/3) \end{bmatrix}$$

where $L_{a0}=(L_d+L_q)/3$, $Las=(L_q-L_d)/3$.

Induced voltages $e_u$, $e_v$ and $e_w$, can be expressed in formula (10), by using the estimated rotating speed $\tilde{\omega}$ and induced voltage constant $K_E$.

$$\begin{cases} e_u = \tilde{\omega} K_E \sin\tilde{\theta} \\ e_v = \tilde{\omega} K_E \sin(\tilde{\theta} - 2\pi/3) \\ e_w = \tilde{\omega} K_E \sin(\tilde{\theta} + 2\pi/3) \end{cases} \quad (10)$$

Hence, from formulas (9) and (10), the estimated position $\tilde{\theta}$ is obtained as in formula (11).

$$\tilde{\theta}[nT_s] = \frac{\tilde{\theta}_u[nT_s] + \tilde{\theta}_v[nT_s] + \tilde{\theta}_w[nT_s]}{3} \quad (11)$$

where $\tilde{\theta}_u$, $\tilde{\theta}_v$ and $\tilde{\theta}_w$ are expressed in formula (12).

$$\begin{cases} \tilde{\theta}_u[nT_s] = \sin^{-1}\left[\frac{\tilde{e}_u}{(\tilde{\omega}+\delta_0)K_E}\right] \\ \tilde{\theta}_v[nT_s] = \sin^{-1}\left[\frac{\tilde{e}_v}{(\tilde{\omega}+\delta_0)K_E}\right] + \frac{2\pi}{3} \\ \tilde{\theta}_w[nT_s] = \sin^{-1}\left[\frac{\tilde{e}_w}{(\tilde{\omega}+\delta_0)K_E}\right] - \frac{2\pi}{3} \end{cases} \quad (12)$$

where $\delta_0$ is an infinitesimal term for prevention of zero division.

Figure 6:
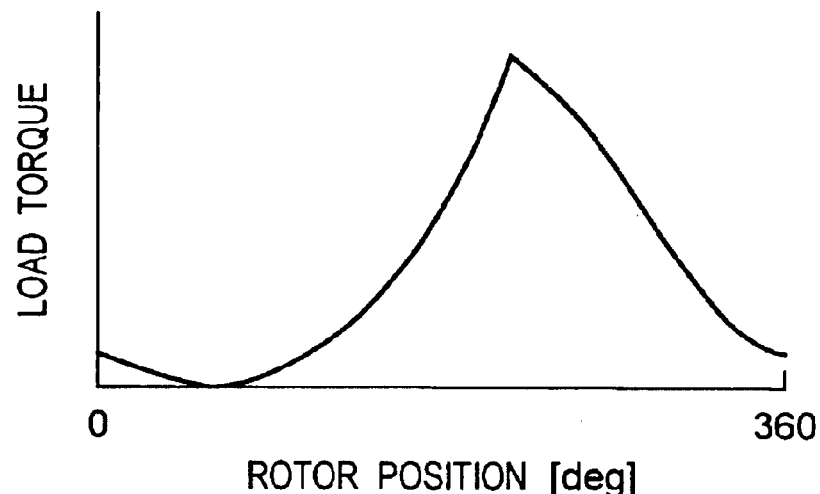
FIG. 6 is a diagram showing a load torque characteristic of a general rotary compressor.
Figure 7:
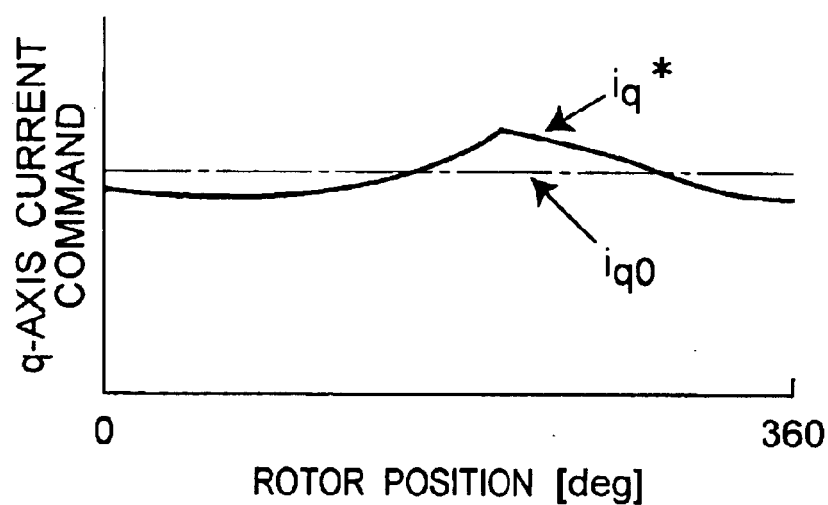
FIG. 7 is a diagram showing an example of an output signal of a torque current correction unit in the control apparatus of SRM according to the invention.

According to the control apparatus of the embodiment, in the case of a general rotary compressor for which the load element of the permanent magnet assistant type synchronous reluctance motor is expressed in FIG. 6, the torque current command conforming to the load torque as shown in FIG. 7 is generated by the torque current correction unit As a result, the output torque of the synchronous reluctance motor may always coincide with the load torque.

Figure 8:
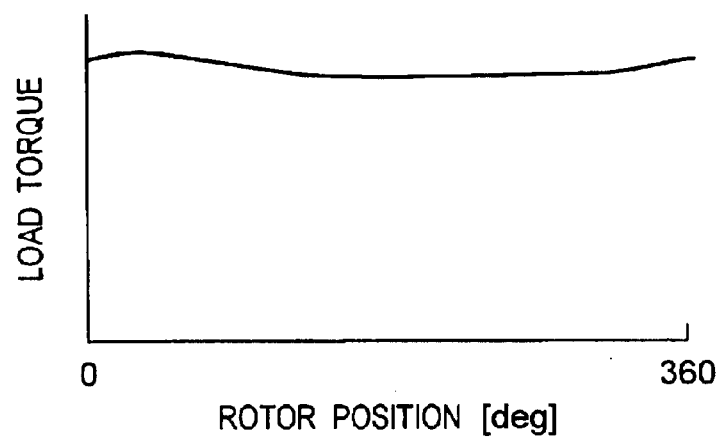
FIG. 8 is a diagram showing a load torque characteristic of a general scroll compressor.

Or, in the case of a general scroll compressor in which the load element of the permanent magnet assistant type synchronous reluctance motor is shown in FIG. 8, according to the control apparatus of the embodiment, since load fluctuations during rotor the rotation are small, it is not usually required to correct the torque current command, and the amount of calculation can be saved substantially by employing a method of, for example, correcting the torque current command in a period of integer multiple times of the control period.

In this explanation, the permanent magnet assistant type synchronous reluctance motor is driven by the sinusoidal operation of 180-degree conduction without using the position sensor. However, since the permanent magnet is used in the rotor in the permanent magnet assistant type synchronous reluctance motor, it is also applicable in a square wave conduction with a position detection system employed in a general electric household appliance such as air conditioner.

Further, the control system of the permanent magnet assistant type synchronous reluctance motor is explained herein, but it is also applicable to a general synchronous reluctance motor.

Therefore, not only the load torque generated by the load element of the permanent magnet assistant type synchronous reluctance motor can be always matched with the output torque of the permanent magnet assistant type synchronous reluctance motor, but also a robust control system against voltage saturation or steep load fluctuations can be realized by estimating the position and speed with the three-phase voltage control equation, and thus torque fluctuations are suppressed to realize low vibration and low noise.

Embodiment 2

Figure 9:
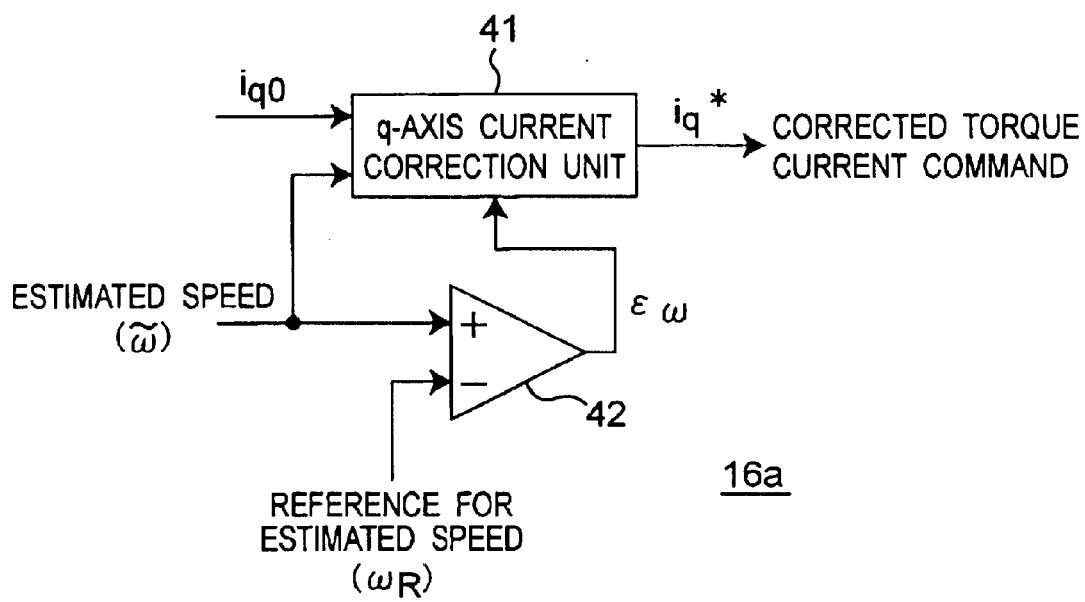
FIG. 9 is a block diagram showing one structural example of the torque current correction unit in the control apparatus of SRM according to the invention.

In this embodiment, the torque current command is corrected only in the low speed region in which the estimated rotating angle $\tilde{\omega}$ is below the reference value. This embodiment differs from embodiment 1 only in the torque current correction unit. FIG. 9 shows a configuration of the torque current correction unit of this embodiment.

The torque current correction unit 16a includes an estimated speed comparator 42 that receives and compares the estimated rotating angle $\tilde{\omega}$ and a predetermined reference of the estimated rotating angle $\omega_R$, and a q-axis current correction unit 41 that corrects the torque current command depending on the output signal of the estimated speed comparator 42.

The output signal $\epsilon_w$ of the estimated speed comparator 42 is calculated as shown in formula (13), from the estimated rotating angle $\tilde{\omega}$ and the reference estimated rotating angle $\omega_R$.

$$\varepsilon_\omega = \begin{cases} 0 & (\tilde{\omega} > \omega_R) \\ 1 & (\tilde{\omega} \leq \omega_R) \end{cases} \quad (13)$$

The output value $i_q^*$ of the q-axis current correction unit 41 is expressed in formula (14), depending on the output signal $\epsilon_w$ of the estimated speed comparator.

$$i_q^* = \begin{cases} i_{q0} & (\varepsilon_\omega = 0) \\ i_{q0} + \left(K_{P2} + \frac{K_{12}}{p}\right)(\tilde{\omega}[nT_s] - \tilde{\omega}[(n-1)T_s]) & (\varepsilon_\omega = 1) \end{cases} \quad (14)$$

That is, the torque current correction unit 16 executes correction of the torque current command (that is, to turn on torque current correction operation) only when the estimated rotating angle $\omega\sim$ is in a low speed region of less than the estimated rotating angle reference value $\omega_R$.

The estimated speed comparator 42 may be provided with hysteresis. That is, in the estimated speed comparator 42, the value of the reference value $\omega_R$ when the estimated rotating angle $\tilde{\omega}$ changes in an increasing direction may be different from the value of the reference value $\omega_R$ when the estimated rotating angle $\tilde{\omega}$ changes in a decreasing direction.

Further, in this explanation, only one reference estimated rotating angle $\omega_R$ is mentioned, but plural reference estimated rotating angles may be specified, and correction or non-correction of the torque current command may be changed over in each rotating speed region specified by each reference value.

Therefore, the operation time for correction of torque current command is saved substantially, and the load capacity of the arithmetic operation device is lessened, and hence the cost can be reduced and the peripheral circuits can be simplified.

Embodiment 3

Figure 10:
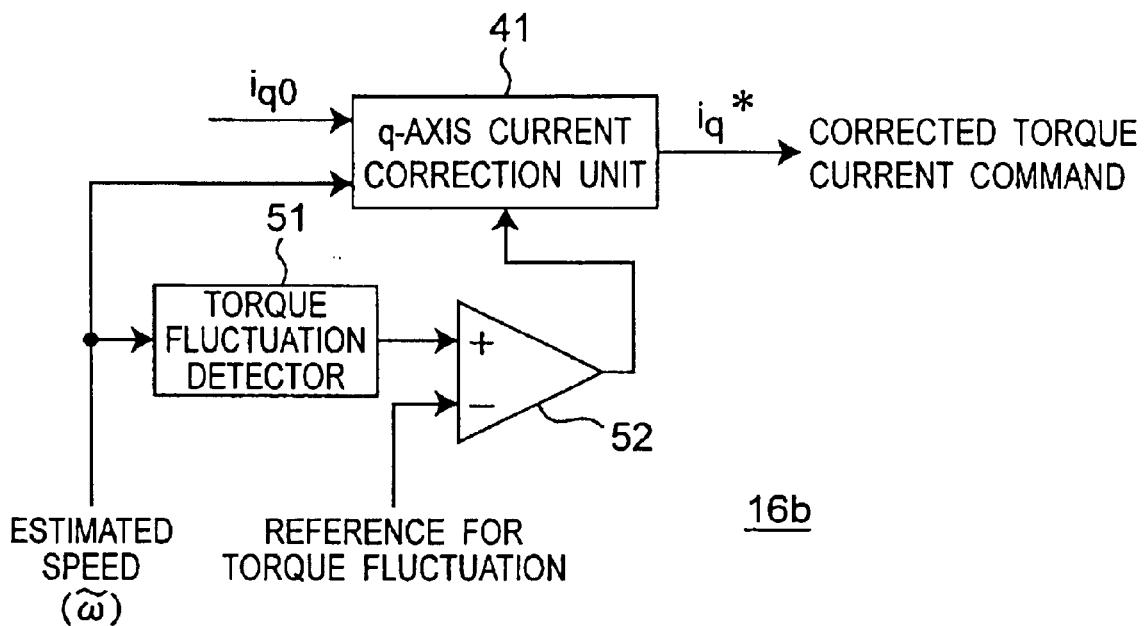
FIG. 10 is a block diagram showing the other structural example of the torque current correction unit in the control apparatus of SRM according to the invention.

In this embodiment, the torque fluctuation amount is detected, and the torque current correction operation is turned on only in the region in which the torque fluctuation amount is larger than a reference value. This embodiment differs from embodiment 1 only in the torque current correction unit. A configuration of the torque current correction unit of the embodiment is shown in FIG. 10.

In the torque current correction unit 16b, a torque fluctuation detector 51 detects a torque fluctuation $\Delta T$ from the estimated rotating angle $\omega\tilde{}$. A torque fluctuation comparator 52 receives the detected torque fluctuation $\Delta T$ from the torque fluctuation detector 51 and a torque fluctuation reference $\Delta T_R$, and compares and outputs the result. The q-axis current correction unit 41 corrects the torque current command depending on the output signal of the torque fluctuation comparator 52.

Specifically, the detected torque fluctuation $\Delta T$, that is, the output signal of the torque fluctuation detector 51 is calculated in formula (15) from the estimated rotating angle $\omega\tilde{}$.

$$\Delta \tau = \frac{K_r}{1+T_r \cdot p} \cdot \frac{\omega\tilde{}[nT_s] - \omega\tilde{}[(n-1)T_s]}{T_s} \quad (15)$$

where $K_T$ and $T_T$ are constants.

The output signal $\epsilon_T$ of the torque fluctuation comparator is expressed in formula (16), in terms of the detected torque fluctuation $\Delta T$ and the reference torque fluctuation $\Delta T_R$.

$$\varepsilon_r = \begin{cases} 0 & (\Delta\tau \leq \Delta\tau_R) \\ 1 & (\Delta\tau > \Delta\tau_R) \end{cases} \quad (16)$$

The output value $i_q^*$ of the q-axis current correction unit 41 is expressed as the following formula (17), depending on the output signal $\epsilon_T$ of the torque fluctuation comparator.

$$i_q^* = \begin{cases} i_{q0} & (\varepsilon_r = 0) \\ i_{q0} + \left(K_{P2} + \frac{K_{12}}{p}\right)(\omega\tilde{}[nT_s] - \omega\tilde{}[(n-1)T_s]) & (\varepsilon_r = 1) \end{cases} \quad (17)$$

That is, the torque current command is corrected only in a region of the detected torque fluctuation $\Delta T$ larger than the reference torque fluctuation $\Delta T_R$.

The torque fluctuation comparator 52 may be provided with hysteresis. That is, in the torque fluctuation comparator 52, the reference $\Delta T_R$ when the detected torque fluctuation $\Delta T$ changes in an increasing direction may be different from the value of the reference $\Delta T_R$ when the detected torque fluctuation value $\Delta T$ changes in a decreasing direction.

Further, in this explanation, only one reference torque fluctuation $\Delta T_R$ is mentioned, but plural torque fluctuation references may be specified, and correction or non-correction of the torque current command may be changed over in each region determined by each reference value.

Therefore, the operation time for correction of torque current command is saved substantially, and the load capacity of the arithmetic operation device is lessened, and hence the cost can be reduced and the torque fluctuations can be suppressed efficiently.

Embodiment 4

In this embodiment, the torque current correction unit acts to prevent the torque current command $i_q^*$ from changing suddenly when changing over from non-correction to correction of torque current so that the torque current command $i_q^*$ may not be discontinuous. This changeover control is explained by referring to FIG. 11.

Figure 11:
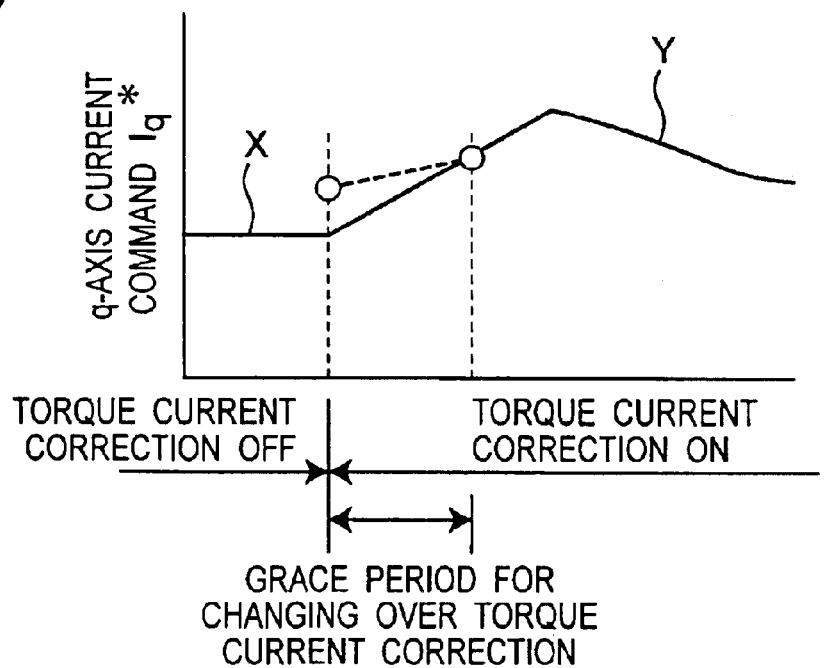
FIG. 11 is a diagram showing a changeover mode of a torque current command at on/off changeover timing of torque current correction operation.

As shown in FIG. 11, a changeover grace period is provided when changing over from the current command (X) in a torque current non-correction operation (torque current correction OFF operation) to the current command (Y) in a torque current correction operation (torque current correction ON operation), thereby preventing the torque current command $i_q^*$ from changing suddenly to be discontinuous.

Specifically, supposing the torque current command in non-correction operation to be $i^*_{q\text{-}off}$, the torque current command in correction operation to be $i^*_{q\text{-}on}$, and the present value of the torque current command to be $i^*_{q\text{-}now}$, when changing from the non-correction operation to correction operation, the present value of the torque current command $i^*_{q\text{-}now}$ is expressed in formula (18).

$$i^*_{q\_now}[nT_s] = \begin{cases} i^*_{q\_now}[(n-1)T_s] - \Delta i_q & (i^*_{q\_now} > i^*_{q\_on}) \\ i^*_{q\_on} & (i^*_{q\_now} = i^*_{q\_on}) \\ i^*_{q\_now}[(n-1)T_s] + \Delta i_q & (i^*_{q\_now} < i^*_{q\_on}) \end{cases} \quad (18)$$

where $\Delta i_q$ is an infinitesimal amount, and is changed over to correction operation when satisfying the condition of $i^*_{q\text{-}now} = i^*_{q\text{-}on}$.

To the contrary, when changing over from the correction operation to non-correction operation, the present value of the torque current command $i^*_{q\text{-}now}$ is expressed in formula (19).

$$i^*_{q\_now}[nT_s] = \begin{cases} i^*_{q\_now}[(n-1)T_s] - \Delta i_q & (i^*_{q\_now} > i^*_{q\_off}) \\ i^*_{q\_off} & (i^*_{q\_now} = i^*_{q\_off}) \\ i^*_{q\_now}[(n-1)T_s] + \Delta i_q & (i^*_{q\_now} < i^*_{q\_off}) \end{cases} \quad (19)$$

where it is changed over to the non-correction operation when satisfying the condition of $i^*_{q\text{-}now} = i^*_{q\text{-}off}$.

Incidentally, as the torque current correction changeover grace period, a maximum period may be determined preliminarily, and it may be designed to change over the torque current command in gradual steps only in the maximum period.

Thus, the control stability and reliability at the time of on/off changeover of torque current control can be enhanced and disturbance of the motor can be prevented.

Embodiment 5

Figure 12:
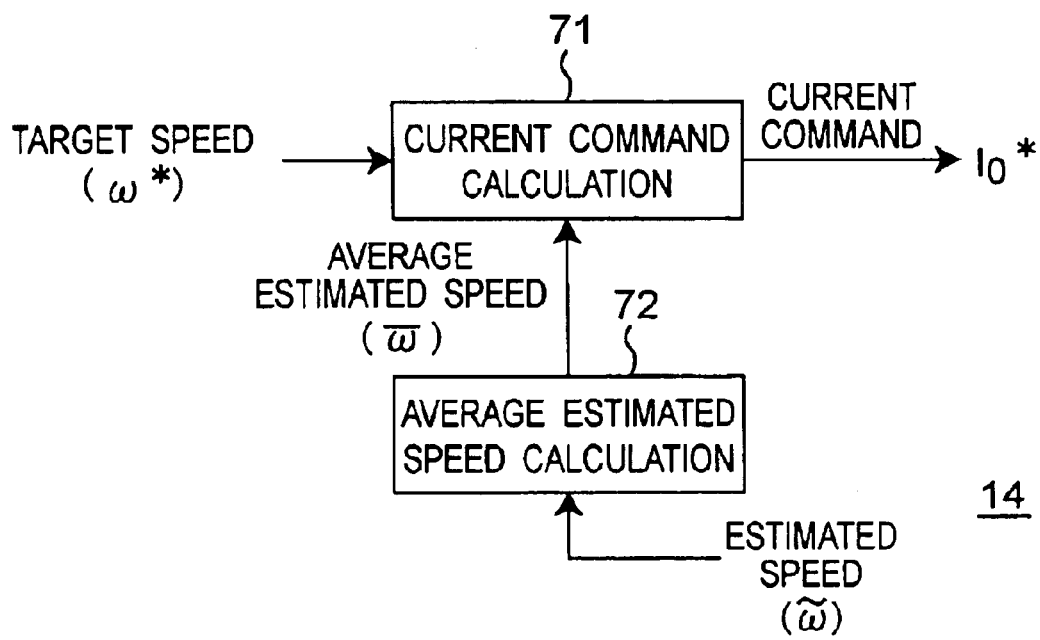
FIG. 12 is a block diagram showing an example of a configuration of the speed control unit in the control apparatus of SRM according to the invention.

FIG. 12 shows a structural example of the speed control unit 14. The speed control unit 14 includes a current command calculation unit 71 and an average estimated speed calculation unit 72. When the torque current correction is turned on, the average estimated speed calculation unit 72 calculates the average $\omega_{ave}$ of the estimated rotating speed $\omega\tilde{}$, and the current command calculation unit 71 calculates the current command I0* so as to null the speed error of the rotating speed command $\omega^*$ given from outside and the average estimated speed $\omega_{ave}$. When the torque current correction is turned off, the average estimated speed calculation unit 72 does not calculate the average, but directly feeds the estimated rotating speed value $\omega\tilde{}$, while the current command calculation unit 71 calculates the current command I* so as to eliminate the speed difference of the rotating speed command $\omega^*$ given from outside and the estimated rotating speed value $\omega\tilde{}$.

Specifically, the average estimated speed $\omega_{ave}$ is expressed in formula (20).

$$\omega_{ave} = \frac{1}{nT_s} \int_0^{nT_s} \omega\tilde{}\, dt \quad (20)$$

where n is an integer.

When correcting the torque current command, the current command $I_0^*$ expressed in formula (21) is calculated.

$$I_0^* = \left(K_{P5} + \frac{K_{I5}}{p}\right)(\omega^* - \omega_{ave}) \quad (21)$$

where $K_{p5}$ and $K_{I5}$ are gains of the PI compensator.

In non-correction operation of torque current command, the current command I* is calculated in formula (2) without using the average estimated speed $\omega_{ave}$.

In the embodiment, when the torque current correction is turned on, in order to calculate the current command $I_0^*$ by using the average estimated speed $\omega_{ave}$. Thus, even if the torque fluctuation is large, the variation of the current command $I_0^*$ is small, and deviation from the optimum driving point can be kept to a minimum limit. That is, by suppressing the variation of the current command issued from the speed control unit to a minimum limit when correcting the torque current command, deviation from the motor efficiency optimum point can be prevented; and operation of high efficiency is realized.

The average estimated speed calculation unit 72, associating with the correction action of the torque current as mentioned above, changes over its output to the average $\omega_{ave}$ of the estimated rotating speed $\omega^\sim$, or the estimated rotating speed $\omega^\sim$. In this case, at the time of on/off changeover of the correction action of the torque current command, preferably, the estimated speed $\omega$ should be gradually changed, so as to prevent the estimated speed $\omega$ from becoming discontinuous.

Figure 13:
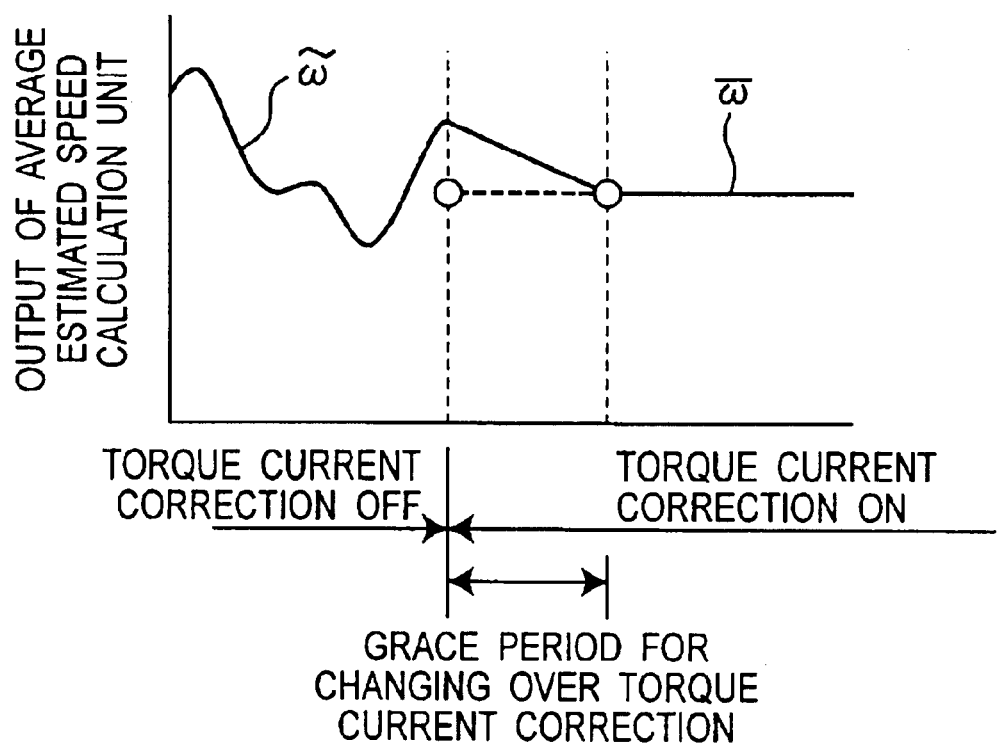
FIG. 13 is a diagram showing a changeover mode of output of the average estimated speed unit in the control apparatus of SRM according to the invention.

That is, when changed from the non-correction operation to correction operation of the torque current command, the average estimated speed calculation unit 72 does not immediately issue the estimated speed average $\omega_{ave}$ ($\omega^\sim$), but as shown in FIG. 13, after a grace period, its output (estimated rotating speed $\omega^\sim$) may be changed in gradual steps by a specific change $\Delta\omega_s$ so as to be closer gradually to the average estimated speed $\omega_{ave}(\omega^\sim)$. As a result, upon changeover of non-correction and correction, the estimated speed $\omega^\sim$ of non-correction operation is smoothly connected to the value of the average estimated speed $\omega_{ave}$ ($\omega^\sim$).

Specifically, supposing the output speed of non-correction operation to be $\omega_{o\text{-}off}$ (estimated rotating speed $\omega^\sim$), the output speed in correction operation (estimated speed average value $\omega_{ave}$) to be $\omega_{o\text{-}on}$, and the present value of the output speed to be $\omega_{o\text{-}now}$, when changing over from the non-correction operation to the correction operation, the present value of the output speed $\omega_{o\text{-}now}$ is expressed in formula (22).

$$\omega_{o\_now}[nT_s] = \begin{cases} \omega_{o\_now}[(n-1)T_s - \Delta\omega_s & (\omega_{o\_now} > \omega_{o\_on}) \\ \omega_{o\_on} & (\omega_{o\_now} = \omega_{o\_on}) \\ \omega_{o\_now}[(n-1)T_s] + \Delta\omega_s & (\omega_{o\_now} < \omega_{o\_on}) \end{cases} \quad (22)$$

where $\Delta T_s$ is a specified infinitesimal value. The output speed $\omega_{o\text{-}now}$ is changed over to the value of the correction operation when satisfying the condition of $\omega_{o\text{-}now}=\omega_{o\text{-}on}$.

To the contrary, when changing over from correction operation to non-correction operation, the present value of the output speed $\omega_{o\text{-}now}$ is expressed in formula (23).

$$\omega_{o\_now}[nT_s] = \begin{cases} \omega_{o\_now}[(n-1)T_s - \Delta\omega_s & (\omega_{o\_now} > \omega_{o\_off}) \\ \omega_{o\_off} & (\omega_{o\_now} = \omega_{o\_off}) \\ \omega_{o\_now}[(n-1)T_s] + \Delta\omega_s & (\omega_{o\_now} < \omega_{o\_off}) \end{cases} \quad (22)$$

The output speed $\omega_{o\text{-}now}$ is changed over to the value of the non-correction operation when satisfying the condition of $\omega_{o\text{-}now}=\omega_{o\text{-}off}$.

Besides, by determining a specific period as changeover grace period, the estimated speed may be changed over gradually by using the formulas (22), (23) only in this specific period.

By provision with the grace period for gradually changing the estimated speed in correction and/or non-correction operation, steep changes of estimated speed can be prevented, and the control stability and reliability in changeover time of correction and non-correction of the torque current command can be enhanced, and hunting due to steep changes of current command can be suppressed.

Embodiment 6

Figure 14:
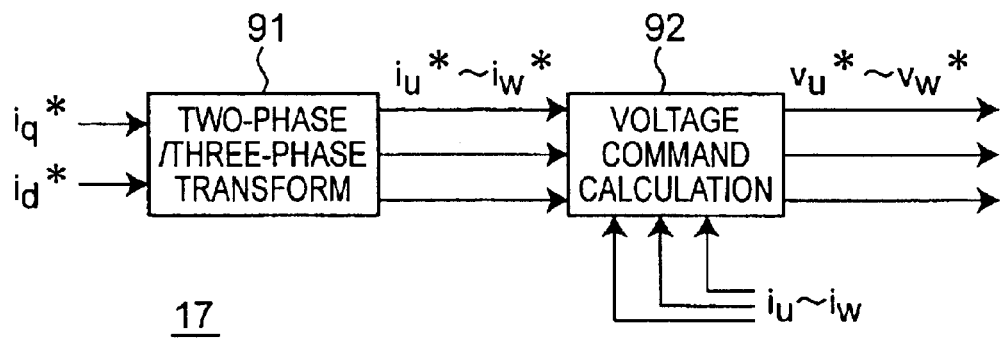
FIG. 14 is a block diagram showing an example of a configuration of the current control unit in the control apparatus of SRM according to the invention.

FIG. 14 shows a structural example of the current control unit 17. The current control unit 17 includes a two-phase/three-phase converter 91 for converting current command of two phases $i_d^*$ and $i_q^*$ into current commands of three phases $i_u^*$, $i_v^*$ and $i_w^*$, and a voltage command unit 92 for obtaining voltage commands of three phases $v_u^*$, $v_v^*$ and $v_w^*$ by using current commands of three phases $i_u^*$, $i_v^*$ and $i_w^*$, and motor current detected values $i_u$, $i_v$, $i_w$.

The current commands of three phases $i_u^*$, $i_v^*$, $i_w^*$ are expressed in formula (24).

$$\begin{bmatrix} i_u^* \\ i_v^* \\ i_w^* \end{bmatrix} = \sqrt{\frac{2}{3}} \begin{bmatrix} \cos\theta^\sim & \sin\theta^\sim \\ \cos(\theta^\sim - 2\pi/3) & \sin(\theta^\sim - 2\pi/3) \\ \cos(\theta^\sim + 2\pi/3) & \sin(\theta^\sim + 2\pi/3) \end{bmatrix} \begin{bmatrix} i_q^* \\ i_d^* \end{bmatrix} \quad (24)$$

The voltage commands of three phases $v_u^*$, $v_v^*$ and $v_w^*$ are expressed in formula (25).

$$\begin{cases} v_u^* = \left(K_{P6} + \frac{K_{I6}}{p}\right)(i_u^* - i_u) \\ v_v^* = \left(K_{P7} + \frac{K_{I7}}{p}\right)(i_v^* - i_v) \\ v_w^* = -v_u^* - v_v^* \end{cases} \quad (25)$$

where $K_{p6}$, $K_{I6}$, $K_{p7}$ and $K_{I7}$ are gains of the PI compensator.

In this configuration, a more accurate voltage command can be generated, and distortion of motor current can be suppressed to a minimum limit, so that lower noise and lower vibration can be realized.

Embodiment 7

Figure 15:
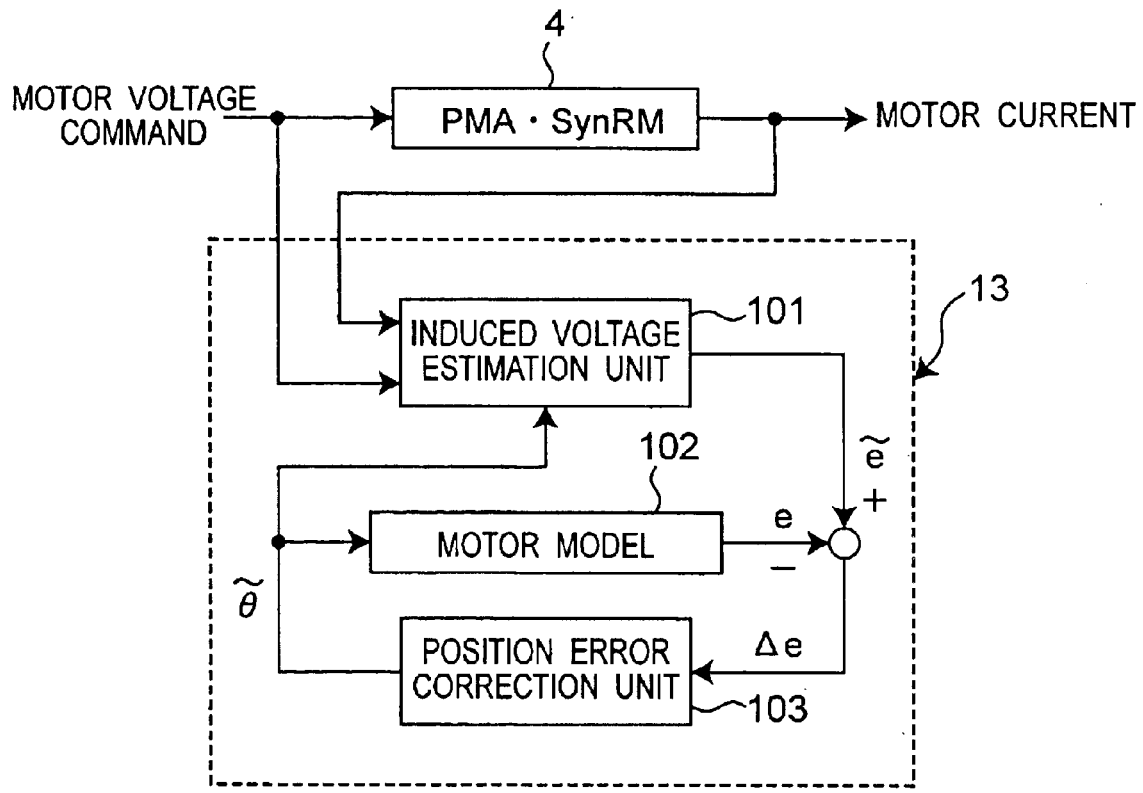
FIG. 15 is a block diagram showing an example of a configuration of the position and speed estimation unit in the control apparatus of SRM according to the invention.

FIG. 15 shows a structural example of the position and speed estimation unit 13. The position and speed estimation unit 13 includes an induced voltage estimation unit 101 and a position error correction unit 103. The induced voltage estimation unit 101 calculates estimated induced voltages $e^\sim_u$, $e^\sim_v$ and $e^\sim_w$ by using voltage commands of three phases $v_u^*$, $v_v^*$ and $v_w^*$ and detected motor currents $i_u$, $i_v$ and $i_w$, and also calculates induced voltages $e_u$, $e_v$ and $e^\sim_w$ from a motor model 102 provided inside. The position error correction unit 103 sequentially corrects the estimated position $\theta^\sim$ so as to eliminate the induced voltage error of the estimated induced voltages $e^\sim_u$, $e^\sim_v$ and $e^\sim_w$, and induced voltages $e_u$, $e_v$ and $e_w$.

Specifically, induced voltage estimated values $e^\sim_u$, $e^\sim_v$ and $e^\sim_w$ are expressed in formula (9) and the induced voltages $e_u$, $e_v$ and $e_w$ are expressed in formula (26).

$$\begin{cases} e_u = V_G[nT_s]\sin\theta^\sim \\ e_v = V_G[nT_s]\sin(\theta^\sim - 2\pi/3) \\ e_w = V_G[nT_s]\sin(\theta^\sim + 2\pi/3) \end{cases} \quad (26)$$

where $V_G[nT_s]$ is sequentially calculated in formulas (27) to (29).

$$\begin{bmatrix} e_{u0} \\ e_{v0} \\ e_{w0} \end{bmatrix} = \begin{bmatrix} v_u^* \\ v_v^* \\ v_w^* \end{bmatrix} - R \begin{bmatrix} i_u^* \\ i_v^* \\ i_w^* \end{bmatrix} + \frac{3}{2}\omega^\sim L_{a0} I^* \begin{bmatrix} \sin(\theta^\sim + \beta) \\ \sin(\theta^\sim + \beta - 2\pi/3) \\ \sin(\theta^\sim + \beta + 2\pi/3) \end{bmatrix} - \quad (27)$$

$$\frac{3}{2}\omega^\sim L_{as} I^* \begin{bmatrix} \sin(\theta^\sim - \beta) \\ \sin(\theta^\sim - \beta - 2\pi/3) \\ \sin(\theta^\sim - \beta + 2\pi/3) \end{bmatrix}$$

$$e_0 = K_4(|e_{u0}| = e_{v0} = |e_{w0}|) \quad (28)$$

$$V_o[nT_s] = \frac{m \cdot V_G[(n-1)T_s] + (1-m) \cdot e_0}{m} \quad (29)$$

where $K_e$ is a constant, and m is an integer.

The position error correction unit 103 sequentially corrects the estimated position $\theta^\sim$ in formula (30) depending on the code information of the induced voltage error $\Delta e_{uvw} = e^\sim_{uvw} - e_{uvw}$.

$$\theta^\sim[nT_3] = \theta^\sim[(n-1)T_s] + \Delta\theta^\sim[nT_3] \quad (30)$$

where $\Delta\theta^{18}[nT_s]$ is expressed in formula (31) in terms of estimated position compensation amount $\Delta\theta_p$.

$$\Delta\theta^\sim[nT_s] = \begin{cases} K_{\theta 1} \cdot \Delta\theta^\sim[(n-1)T_s] + \Delta\theta_p & \text{(when advanced)} \\ K_{\theta 2} \cdot \Delta\theta^\sim[(n-1)T_s] - \Delta\theta_p & \text{(when delayed)} \end{cases} \quad (31)$$

where $K_{\theta 1}$ and $K_{\theta 2}$ are constants.

Hence, even if the voltage is saturated, the position and speed can be estimated, and not only the inverter output limit can be increased, but also the stator winding of the synchronous reluctance motor can be wound by a greater number of turns, so that the efficiency of the entire driving system can be enhanced.

Embodiment 8

In this embodiment, in the position and speed estimation unit 13 shown in embodiment 7, the induced voltage estimated value is calculated by using a compensated motor constant, resulting in improved precision of position and speed estimation.

Figure 16:
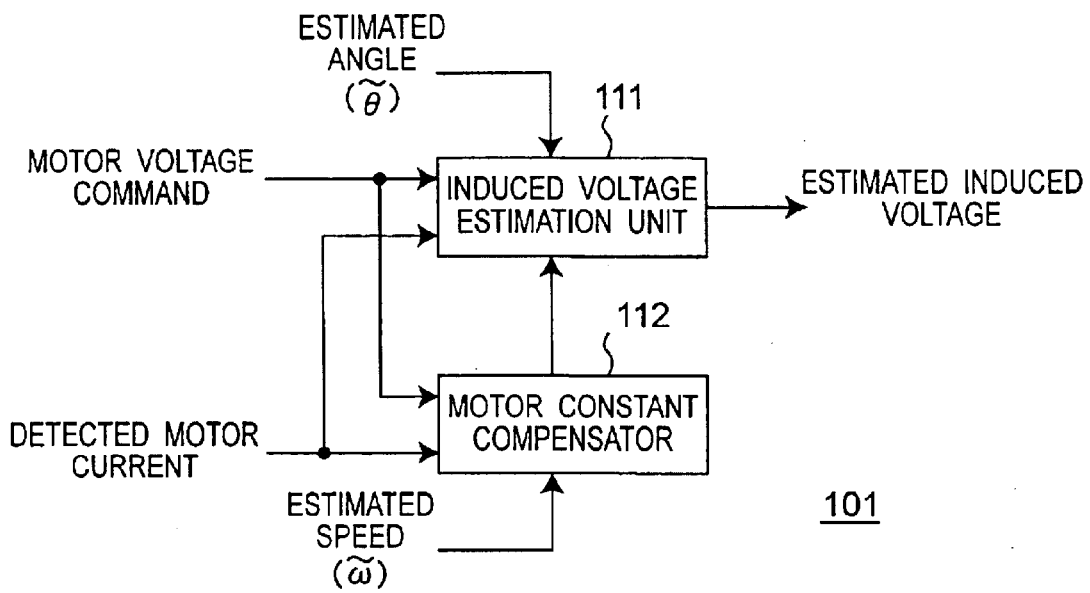
FIG. 16 is a block diagram showing an example of a configuration of the induced voltage estimation unit in the control apparatus of SRM according to the invention.

FIG. 16 shows a configuration of induced voltage estimation unit 101 in the position and speed estimation unit 13. The induced voltage estimation unit 101 includes an induced voltage estimation unit 111 and a motor constant compensator 112.

The motor constant compensator 112 compensates the motor constant by using the three-phase voltage command, detected motor current, and estimated speed. The induced voltage estimation unit 111 calculates the estimated induced voltage by using the three-phase voltage command, detected motor current, and compensated motor constant. Explained below is a method of compensating the motor winging resistance as one of the motor constants, by the voltage equation on the d-q axis.

Specifically, the voltage equation on the d-q axis is expressed in formula (32).

$$\begin{bmatrix} v_d \\ v_q \end{bmatrix} = \begin{bmatrix} R + L_d p & -\omega L_q \\ \omega L_d & R + L_q p \end{bmatrix} \begin{bmatrix} i_d \\ i_q \end{bmatrix} + \begin{bmatrix} 0 \\ \omega_{ma} K_E \end{bmatrix} \quad (32)$$

where $\omega_{me}$ is a actual rotating speed of a rotor.

Herein, near the operating point, supposing the d-q axis and γ-δ axis (see FIG. 2) are nearly in coincidence, by approximating $\Delta\theta \approx 0$, formula (32) is rewritten as in formula (33).

$$\begin{cases} v_\delta = Ri_\delta + L_d \cdot pi_\delta - \omega^\sim L_q i_\gamma \\ v_\gamma = Ri_\gamma + L_q \cdot pi_\gamma + \omega^\sim L_d i_\delta + \omega^\sim K_E \end{cases} \quad (33)$$

Supposing the motor winding resistance compensated to be $R^\sim$, formula (33) is modified into formula (34).

$$(R^\sim - R) \cdot i_\delta^2 = R^\sim i_\delta^2 - (v_\delta i_\delta - L_d i_\delta \cdot pi_{67} + \omega^\sim L_q i_\delta i_\gamma) \quad (34)$$

Herein, from formula (34), regardless of the sign of $i_{67}$, the relation of the compensated value $R^\sim$ and true value R is determined, and when $R^\sim$ is greater than R, the right side is positive, while it is negative in a reverse case. Using formula (35), the motor winding resistance value is compensated.

$$R^\sim[nT_s] = R^\sim[(n-1)T_s] - K_R \int_{n-1)T_s}^{nT_s} \{R^\sim[(n-1)T_s]i_\delta^2 - (v_\delta i_\delta - L_d i_\delta \cdot pi_\delta + \omega^\sim L_q i_\gamma i_{67})\} dt \quad (35)$$

where $K_R$ is an integral gain.

In formula (35), only the right side of formula (34) is integrated, but by PI compensation by adding proportional term, the response is enhanced.

When the sign of $i_\delta$ is not changed, each side of formula (35) can be divided by $i_\delta$ to shorten the calculation time.

Not limited to the motor winding resistance, the invention can be also applied to other motor constants such as inductance and induced voltage constant.

Accordingly, by using an accurate motor constant, not only the estimation precision of position and speed can be always enhanced, but also the power loss can be suppressed to a minimum limit.

Embodiment 9

This embodiment relates to a configuration of the motor constant compensation unit in the position and speed estimation unit 13 shown in embodiment 8 for changing over on/off operation of compensation action of the motor constant depending on the speed.

Figure 17:
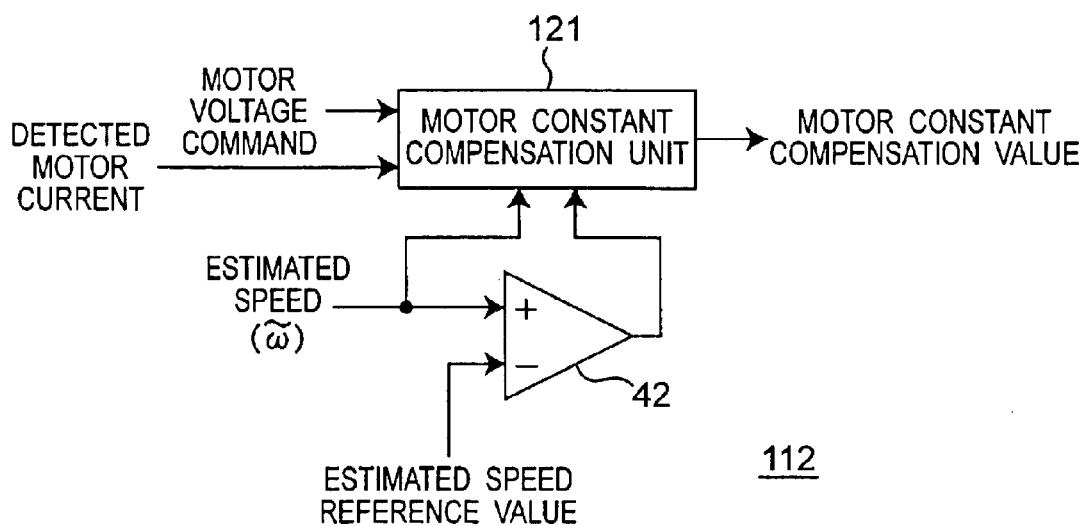
FIG. 17 is a block diagram showing an example of a configuration the motor constant compensation unit in the control apparatus of SRM according to the invention.

FIG. 17 shows a configuration of a motor constant compensator 112. The motor constant compensator 112 includes an estimated speed comparator 42 for receiving and comparing the estimated rotating angle $\omega^{18}$ and a predetermined reference $\omega_R$ of the estimated rotating angle, and a motor constant compensation unit 121 for compensating the motor constant depending on the output signal of the estimated speed comparator 42.

The following explanation shows a case of compensation of the motor winding resistance value R which is one of motor constants.

The output signal $\epsilon_w$ of the estimated speed comparator 42 is expressed in formula (13) from the estimated rotating angle $\omega^\sim$ and the reference estimated rotating angle $\omega_R$. The output $R_{out}$ of the motor constant compensation unit 121 is expressed in formula (36) depending on the output signal $\epsilon_w$ of the estimated speed comparator 42.

$$R_{out} = \begin{cases} R^\sim & (\epsilon_\omega = 0) \\ R_n & (\epsilon_\omega = 1) \end{cases} \quad (36)$$

where $R^\sim$ is the compensated motor winding resistance expressed in formula (35) and $R_n$ is nominal value.

As known from the above formula, the motor constant compensator 112 compensates the motor constant only in the high speed region in which the estimated rotating angle $\omega^\sim$ is larger than the reference estimated rotating angle $\omega_R$. As a result, the calculation time for compensation of the motor constant is substantially shortened, and the load capacity of the arithmetic operation device is lessened, and hence the cost is reduced and the peripheral circuits are simplified.

The estimated speed comparator 42 may be provided with hysteresis. That is, in the estimated speed comparator 42, the value of the reference $\omega_R$ when the estimated rotating angle $\omega_R$ changes in an increasing direction may be different from the value of the reference $\omega_R$ when the estimated rotating angle $\omega^\sim$ changes in a decreasing direction.

Further, in this explanation, only one estimated rotating angle reference value $\omega_R$ is mentioned, but plural estimated rotating angle references may be specified, and compensation or non-compensation of the motor constant may be changed over in each rotating speed region.

Further, not limited to the motor winding resistance, the invention may be also applied to other motor constants such as inductance and induced voltage constant.

Embodiment 10

Figure 18:
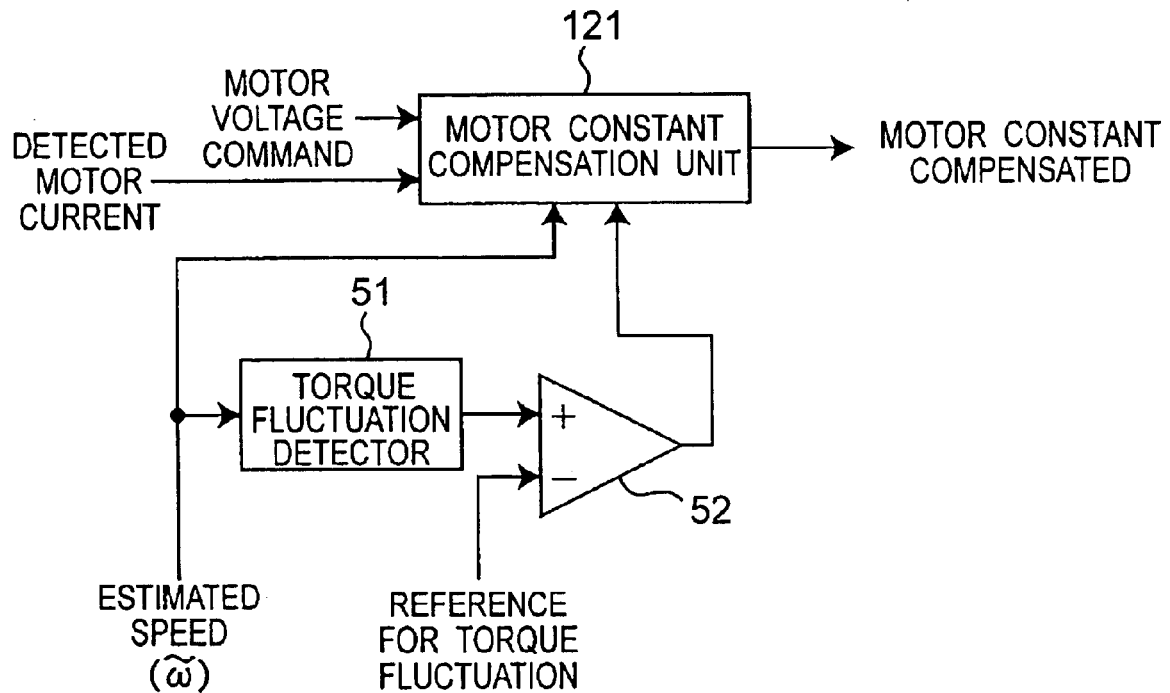
FIG. 18 is a block diagram showing other example of a configuration of the motor constant compensation unit in the control apparatus of SRM according to the invention.

Other configuration of the motor constant compensator is shown in FIG. 18. In this embodiment, the torque fluctuation amount is detected, and the motor constant is compensated only in a region in which the fluctuation amount is equal to or smaller than the reference value. That is, the motor constant compensation action is turned on or off depending on the torque fluctuation amount.

As shown in FIG. 18, the motor constant compensator 112b includes a torque fluctuation detector 51, a torque fluctuation comparator 52, and a motor constant compensation unit 121. The torque fluctuation detector 51 detects the torque fluctuation $\Delta T$ by the estimated rotating angle $\omega^\sim$. The torque fluctuation comparator 52 receives and compares the detected torque fluctuation $\Delta T$ and torque fluctuation reference $\Delta T_R$. The motor constant compensation unit 121 compensates the motor constant depending on the output signal of the torque fluctuation comparator 52.

The following explanation shows a case of the compensated motor winding resistance $R^\sim$ as one of motor constants.

The detected torque fluctuation $\Delta T$ which is an output signal of the torque fluctuation detector 51 is expressed in formula (15) from the estimated rotating angle $\omega^\sim$. The output signal $\epsilon_T$ of the torque fluctuation comparator is expressed in formula (16) from the detected torque fluctuation $\Delta T$ and the reference torque fluctuation $\Delta T_R$. The output $R_{out}$ of the motor constant compensation unit 121 is expressed in formula (37) depending on the output signal $\epsilon_\gamma$ of the torque fluctuation comparator.

$$R_{out} = \begin{cases} R^\sim & (\epsilon_\tau = 0) \\ R_n & (\epsilon_\tau = 1) \end{cases} \tag{37}$$

where $R^\sim$ is the compensated motor winding resistance expressed in formula (35) and $R_n$ is nominal value.

As known from the above formula, the motor constant is compensated only in a region in which the detected torque fluctuation $\Delta T$ is smaller than the reference torque fluctuation $\Delta T_R$.

The torque fluctuation comparator 52 may be provided with hysteresis.

Further, in this explanation, only one torque fluctuation reference value $\Delta T_R$ is mentioned, but plural torque fluctuation reference values may be specified, and compensation or non-compensation of the motor constant may be changed over in each region.

Further, not limited to the motor winding resistance, the invention may be also applied to other motor constants such as inductance and induced voltage constant.

As a result, the calculation time for compensation of motor constant is shortened to a required minimum limit, and the load capacity of the arithmetic operation device is lessened, and hence the cost is reduced substantially.

Embodiment 11

Figure 19:
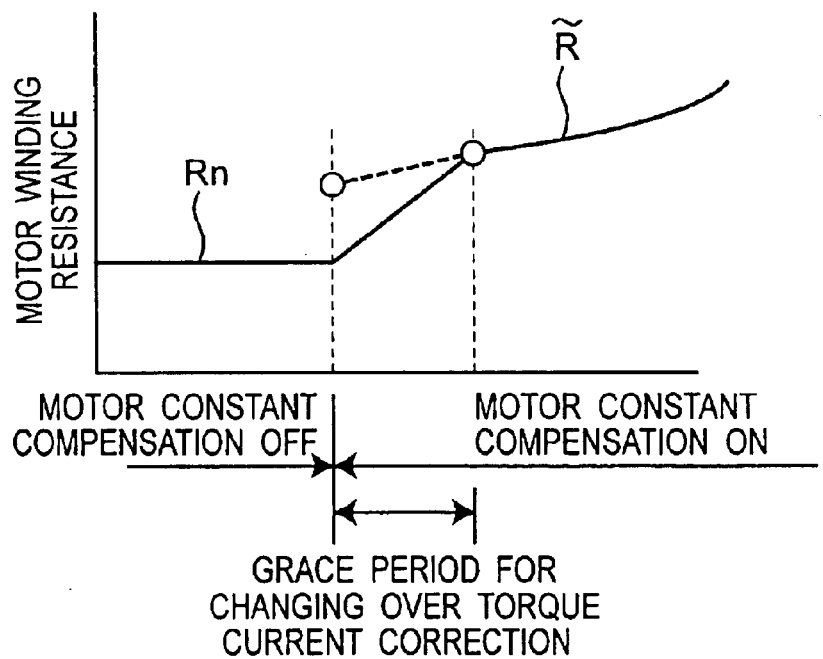
FIG. 19 is a diagram showing a changeover mode of an output of the motor constant compensation unit at on/off changeover timing of motor constant compensation operation.

In embodiments 8 to 10, the on/off changeover control of compensation action of the motor constant in the motor constant compensator 112 is explained by referring to FIG. 19.

In this embodiment, in the motor constant compensation action in embodiments 8 to 10, when changed over from non-compensation (compensation action OFF) of the motor constant to compensation (motor winding resistance) to compensation (compensation action ON), as shown in FIG. 19, a grace period is provided for motor constant compensation changeover. As a result, steep changes of motor constant are suppressed to prevent the motor constant from being discontinuous.

Specifically, supposing the motor winding resistance in non-compensation to be $R_{off}$, motor winding resistance in compensation operation to be $R_{on}$, and present value of motor winding resistance to be $R_{now}$, when changed from non-compensation to compensation operation, the present value of motor winding resistance $R_{now}$ issued from the motor constant compensation unit 121 is expressed in formula (38).

$$R_{now}[nT_s] = \begin{cases} R_{now}[(n-1)T_s] - \Delta R & (R_{now} > R_{on}) \\ R_{on} & (R_{now} = R_{on}) \\ R_{now}[(n-1)T_s] + \Delta R & (R_{now} < R_{on}) \end{cases} \tag{38}$$

where $\Delta R$ is a specified infinitesimal amount. The output from the motor constant compensation unit 121 is changed gradually in the grace period by $\Delta R$ each so as to approach the value $R_{on}$ in the compensation operation, and when satisfying the condition of $R_{now}=R_{on}$, it is changed over to the value $R_{on}$ in the compensation operation.

To the contrary, when changing over from the compensation operation to non-compensation operation, the present value of the motor winding resistance Rnow issued from the motor constant compensation unit 121 is expressed in formula (39).

$$R_{now}[nT_s] = \begin{cases} R_{now}[(n-1)T_s] - \Delta R & (R_{now} > R_{off}) \\ R_{off} & (R_{now} = R_{off}) \\ R_{now}[(n-1)T_s] + \Delta R & (R_{now} < R_{off}) \end{cases} \tag{39}$$

That is, the output from the motor constant compensation unit 121 is changed gradually by $\Delta R$ each so as to approach the value of $R_{off}$ in the non-compensation operation in the grace period, and when satisfying the condition of $R_{now}=R_{off}$, it is changed over to the value of $R_{off}$ in the non-compensation operation.

Incidentally, as the changeover grace period for motor constant compensation, a specific period may be determined, and it may be designed to change over the motor winding resistance value in gradual steps only in this specific period.

Thus, the control stability and reliability at the time of on/off changeover of motor constant compensation action can be enhanced, and disturbance or out-of-control of the motor can be prevented.

Embodiment 12

In this embodiment, detecting the voltage saturation rate of the synchronous reluctance motor, it is designed to control to lower the target speed in order to avoid saturation when the voltage saturation rate is higher than a specified value.

Figure 20:
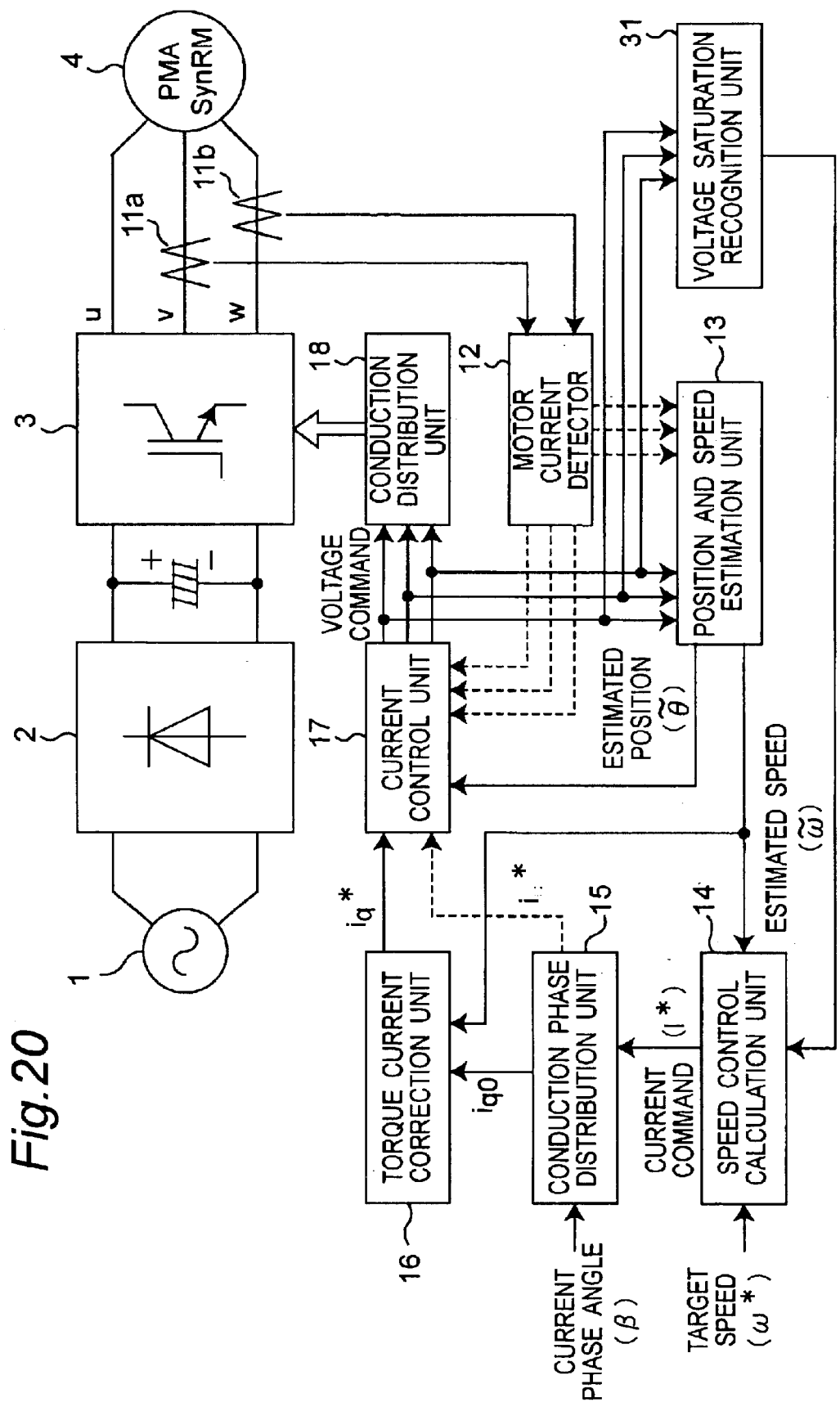
FIG. 20 is a diagram showing the other example of entire configuration of the control apparatus of the synchronous reluctance motor according to the invention.

FIG. 20 shows a configuration of a control apparatus of a synchronous reluctance motor of the embodiment. The control apparatus in this embodiment includes, in addition to the configuration of the control apparatus in embodiment 1, a voltage saturation recognition unit 31 for obtaining the degree of voltage saturation (voltage saturation rate) from the voltage command of the synchronous reluctance motor 4.

The voltage saturation recognition unit 31 calculates the voltage saturation rate $\delta_{vol}$ in the following formula.

$$\sigma_{vol} = \frac{\sqrt{v_\gamma^{*2} + v_\delta^{*2}}}{V_R} \tag{40}$$

where $V_R$ is the reference voltage (voltage set value when the voltage saturation rate is 100%), and $v_\delta^*$ and $v_y^*$ are y-$\delta$ axis voltage commands. The values of $v_\delta^*$ and $v_y^*$ are obtained from formula (6).

The voltage saturation recognition unit 31 includes the voltage saturation rate $\delta_{vol}$ obtained in formula (40) and preset voltage compensation rate set value $\delta_R$, and issues the result of comparison to the speed control unit 14.

The speed control unit 14, on the basis of the result of comparison from the voltage saturation recognition unit 31, decreases the target rotating speed $\omega^*$ given from outside if $\delta_{vol} \geq \delta_R$. For example, a target rotating speed value $\omega^*$ is decreased by formula (41).

$$\omega^* = \omega \times a (a<1) \tag{41}$$

The speed control unit 14 decreases the rotating speed target value $\omega^*$ until the voltage saturation rate becomes smaller than the reference value, and determines the current command by using the decreased value.

In the operating region in which the voltage saturation occurs (mainly high speed region), $V_y^*$ and $v_\delta^*$ are nearly proportional to the rotating speed (in the synchronous motor or synchronous reluctance motor, rotating speed target value≈motor actual rotating speed) (see formula (33) for example). Thus, the voltage saturation rate calculated in formula (40) can be lowered by lowering the rotating speed target value.

Accordingly, by avoiding excessive voltage saturation, it is possible to avoid increase of error of estimated position $\theta^-$ in the position and speed estimation unit, and out-of-control can be prevented.

Embodiment 13

Figure 21:
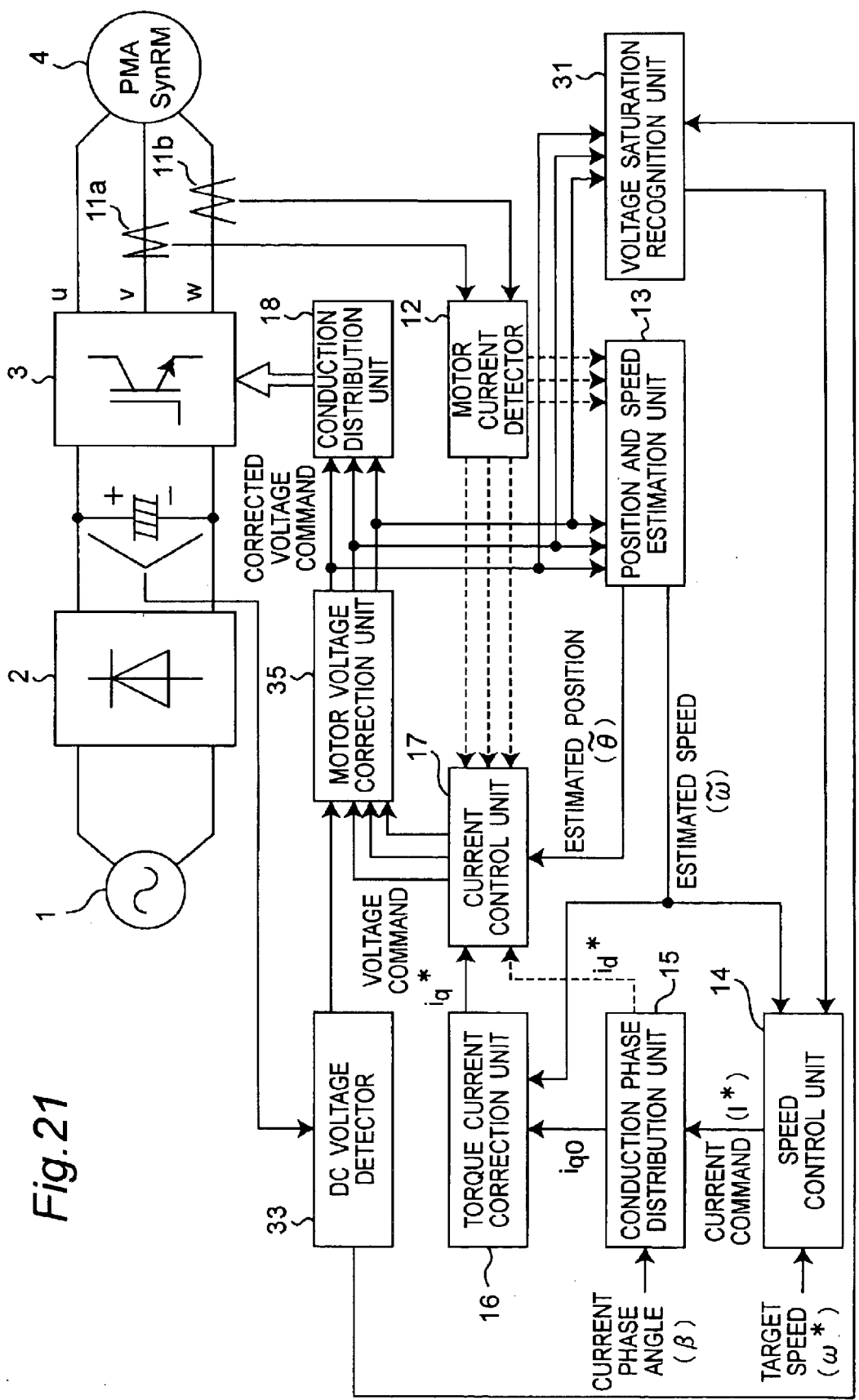
FIG. 21 is a diagram showing still other example of entire configuration of the control apparatus of the synchronous reluctance motor according to the invention.

FIG. 21 shows a configuration of a control apparatus of a synchronous reluctance motor of this embodiment. The control apparatus in the embodiment includes, in addition to the configuration of the control apparatus in embodiment 1, a voltage saturation recognition unit 31 for obtaining the degree of voltage saturation (voltage saturation rate) from the voltage command of the synchronous reluctance motor 4, a DC voltage detector 33 for detecting the direct-current voltage applied into the inverter 3 (hereinafter referred to as "inverter DC voltage"), and a motor voltage correction unit 35 for correcting the motor voltage command so as to cancel ripples of the inverter DC voltage.

The voltage saturation recognition unit 31 calculates the voltage saturation rate from the voltage command of the synchronous reluctance motor 4, compares it with a predetermined voltage saturation rate set value, and outputs the result of comparison to the speed control unit 14. At this time, in the voltage saturation recognition unit 31, the voltage saturation rate set value is corrected depending on pulsations of the inverter DC voltage. That is, the voltage saturation recognition unit 31 receives the detected value of the inverter DC voltage from the DC voltage detector 33, and corrects the voltage saturation set value depending on the pulsations of the inverter DC voltage. As a result, protection control in voltage saturation in consideration of pulsation component of the inverter DC voltage is realized. The correction value $\sigma_{Rh}$ of the voltage saturation set value is determined in the following formula.

$$\sigma_{Rh} = \sigma_R \cdot \frac{V_0}{V_{dc}} \tag{42}$$

where $\sigma_R$ is the predetermined voltage saturation rate set value, and $V_0$ is a predetermined reference of the inverter DC voltage.

The motor voltage correction unit 35 corrects the motor voltage command from the current control unit 17 on the basis of the inverter DC voltage Vdc detected by the DC voltage detector 33, and thereby to reduce distortion of the motor current waveform. The corrected motor voltage command $V_{jh}^*$ is determined in the following formula.

$$v_{jh}^* = v_j^* \cdot \frac{V_0}{v_{dc}} \tag{43}$$

where j=u, v, w, $V_j^*$ is motor voltage command calculated by the current control unit 17, $V_{dc}$ is the inverter DC voltage detected by the DC voltage detector 33, and $V_0$ is the predetermined reference of the inverter DC voltage (set at the maximum value of the inverter DC voltage).

The speed control unit 14, on the basis of the result of comparison from the voltage saturation recognition unit 31, decreases the rotating speed target value given from outside only when the voltage saturation rate calculated from the voltage command is equal to or larger than the voltage saturation rate set value, and determines the current command on the basis of this lowered target value.

The reason for correcting the motor voltage command and voltage saturation rate set value on the basis of the inverter DC voltage $V_{dc}$ is explained below.

Figure 22:
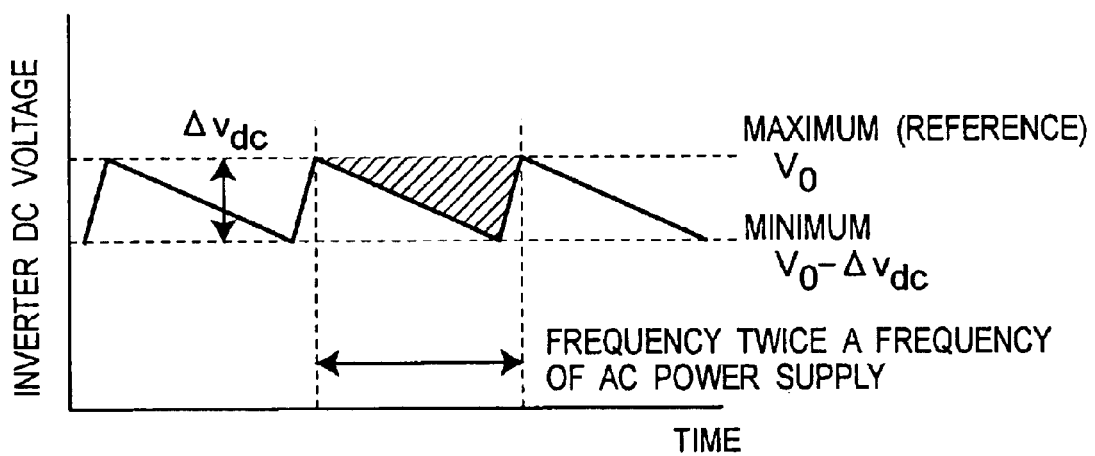
FIG. 22 is a diagram explaining ripple components of an inverter direct-current voltage.
Figure 23:
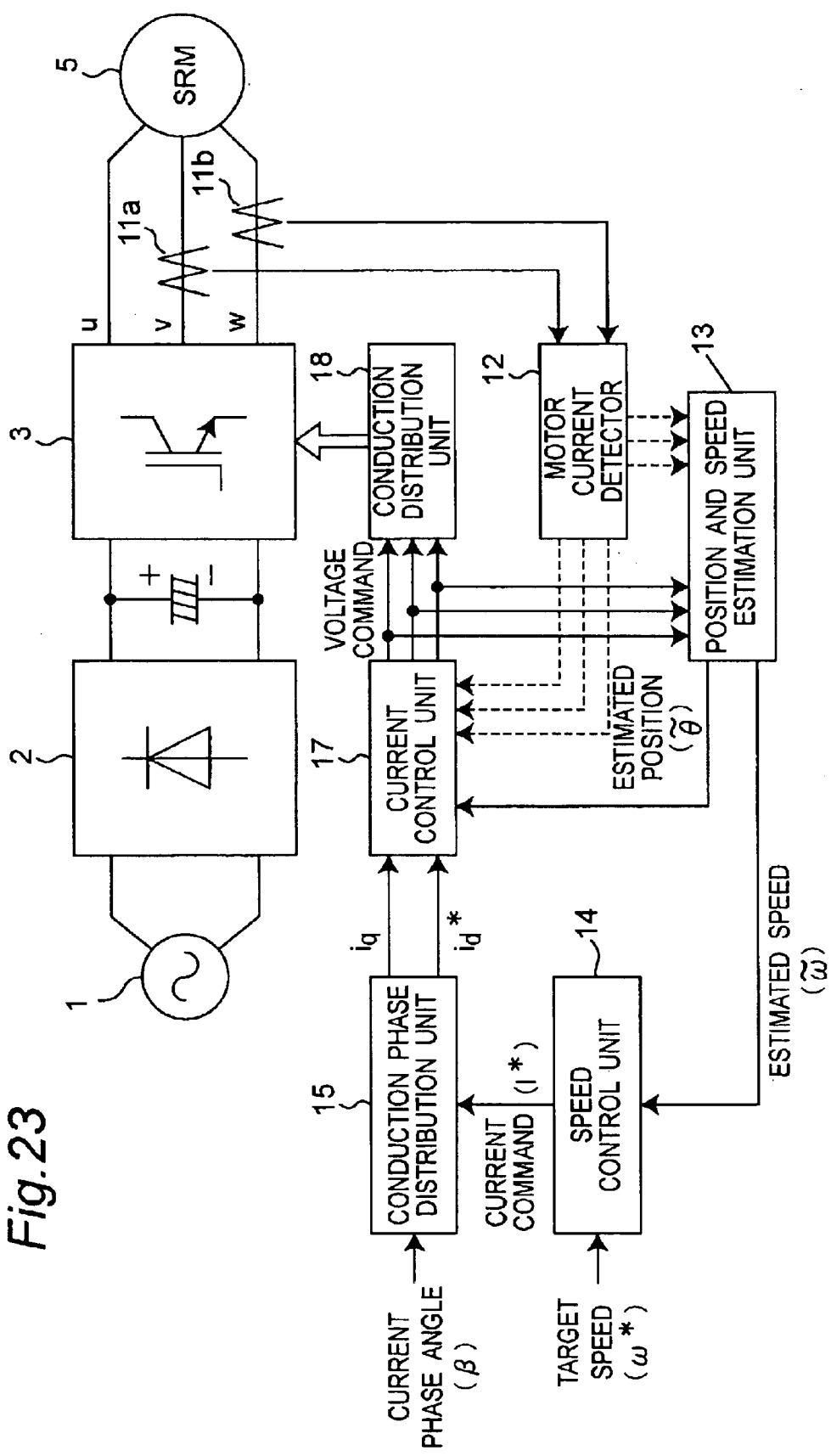
FIG. 23 is a block diagram of a conventional control apparatus of synchronous reluctance motor.
Figure 24:
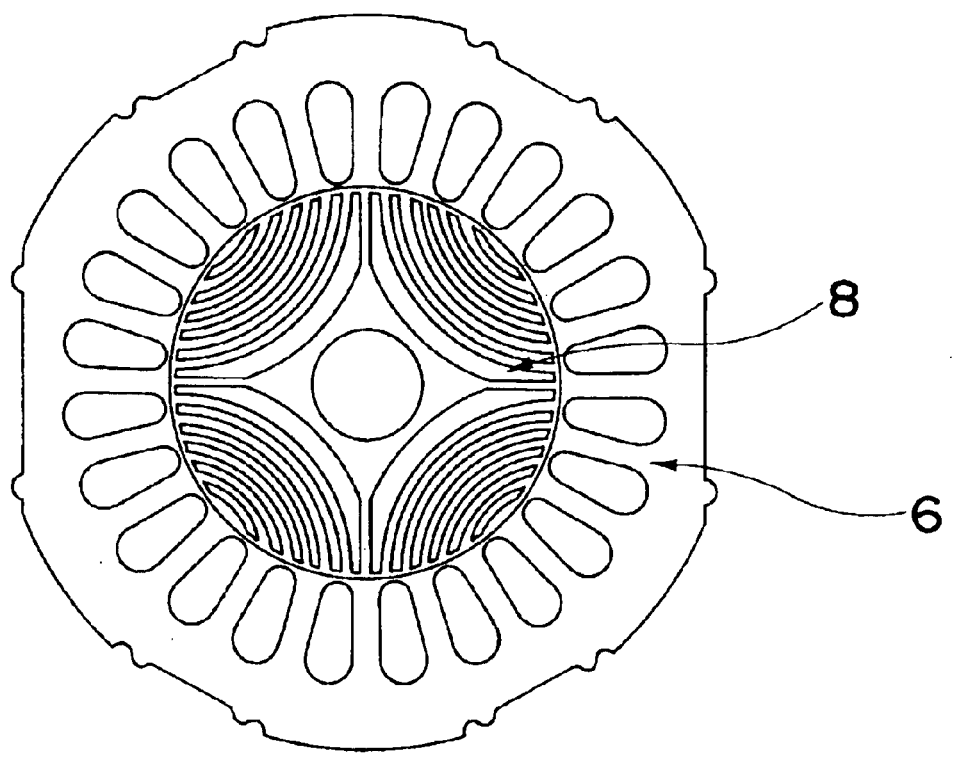
FIG. 24 is a diagram showing a example of configuration of a conventional synchronous reluctance motor.

Generally, an inverter DC voltage pulsates at a double frequency of AC power supply frequency as shown in FIG. 22, and the voltage fluctuation width $\Delta V_{dc}$ increases in proportion to the load torque generated by the load element. Accordingly, the actual motor applied voltage is decreased by the portion of the shaded area in FIG. 22, and the motor current waveform is distorted.

Accordingly, concerning the motor voltage command $V_j^*$, as shown in formula (43), by correcting the voltage shortage due to pulsation of the inverter DC voltage by using the inverter DC voltage detected value, the actual applied motor voltage is adjusted to a desired value as commanded.

Herein, the motor correction voltage command (motor applied voltage) reaches the maximum when the inverter DC voltage is the minimum ($V_0 - \Delta V_{dc}$) in FIG. 22. The maximum value $V_{jh\_max}$ of the corrected motor correction voltage command (motor applied voltage) is expressed in formula (44).

$$v_{jh\_max}^* = v_j^* \frac{V_0}{V_0 - \Delta v_{dc}} \tag{44}$$

where j=u, v, w.

At this time, the voltage fluctuation rate $\sigma_{vol\_max}$ is calculated in formula (45) by three-phase to two-phase conversion of the maximum value of the corrected motor voltage command in formula (44).

$$\sigma_{\text{vol\_max}} = \frac{V_0}{V_0 - \Delta v_{dc}} \frac{\sqrt{v_\gamma^{*2} + v_\delta^{*2}}}{V_R} \quad (45)$$

This formula indicates that the motor voltage command increases by correcting the pulsation of the inverter DC voltage, so that the voltage saturation rate is increased. That is, when the voltage saturation rate set value $\sigma_R$ is constant, by correcting the pulsation of the inverter DC voltage, it is easy to transfer to the protection control of the voltage saturation, and the driving performance in high speed region is lowered.

To prevent drop of driving performance in high speed region, it is required to correct also the voltage saturation rate set value $\sigma_R$ based on pulsation of the inverter DC voltage as shown in formula (42). Thus, by correcting the voltage saturation rate set value $\sigma_R$, high speed operation is realized without lowering the driving performance, and the distortion of the motor current waveform decreases, and hence the efficiency and control stability are enhanced, and a further high speed operation is realized.

When the DC voltage setting is changed from 240 V (at 50 rps) to 280 V (at 100 rps) by the voltage control of the AC/DC converter 2, that is, if the value of the inverter DC voltage varies depending on the operating condition (for example, speed region), the inverter DC voltage reference value $V_0$ may not be a predetermined fixed value, but be the average of actual DC voltage detected value or the voltage set value of the AC/DC converter 2, to correct the pulsation of the inverter DC voltage.

In this configuration, by decreasing the distortion of motor current waveform by keeping the actual motor applied voltage as commanded, not only numerous merits are obtained such as improvement of efficiency, reduction of noise and vibration, and enhancement of control stability (decrease of error of estimated position), but also by correcting the voltage saturation set value simultaneously based on pulsation of the inverter DC voltage, an equivalent or superior driving performance can be realized in the high speed region.

Having described preferred embodiments of the invention, it is to be understood that various changes and modifications may be effected therein by one skilled in the art hence the invention is not limited to these illustrated embodiments, but may be limited only by the scope or spirit of the appended claims.

What is claimed is:

1. A motor control apparatus of a synchronous reluctance motor comprising:
    a current detector that detects a motor current flowing in a stator winding of the synchronous reluctance motor;
    a position and speed estimation unit that estimates an induced voltage of the synchronous reluctance motor from the detected value by the current detector and a voltage command which is a command to a voltage to be applied to the stator winding of the synchronous reluctance motor, and estimated rotor position and rotating speed of the synchronous reluctance motor on the basis of the estimated induced voltage;
    a speed control unit that determines a current command which is a command to a current to be supplied to the stator winding of the synchronous reluctance motor so as to eliminate the error of the estimated rotating speed by the position and speed estimation unit and a target value of the rotating speed given from outside;
    a distribution unit that distributes the current command from the speed control unit into a torque current command which is a torque current component of the current command and a field current command which is a field current component of the current command, on the basis of a predetermined current phase angle of the synchronous reluctance motor;
    a torque current correction unit that corrects the torque current command on the basis of the torque current command from the distribution unit and the estimated rotating speed from the position and speed estimation unit, so that a load torque generated by a load element of the synchronous reluctance motor coincides with the output torque of the synchronous reluctance motor;
    a current control unit that generates a voltage command so as to eliminate the error between the corrected torque current command from the torque current correction unit and the detected motor current from the current detector, and the error between the field current command from the distribution unit and the detected motor current obtained from the current detector; and
    a conduction distribution unit that distributes conduction signals into driving elements in the synchronous reluctance motor on the basis of the voltage command.

2. The motor control apparatus of a synchronous reluctance motor according to claim 1, wherein the torque current correction unit changes over a correcting operation for the torque current command, so that a correction to the torque current command is conducted when the estimated rotating speed from the position and speed estimation unit is smaller than a predetermined value, and the correction to the torque current command is not conducted when the estimated rotating speed obtained from the position and speed estimation unit is larger than the predetermined value.

3. The motor control apparatus of a synchronous reluctance motor according to claim 2, wherein the torque current correction unit has a grace period to change over conduct and non-conduct of the correction operation of the torque current command, and during the grace period changes the torque current command gradually to be closer to the value obtained as the value after changeover.

4. The motor control apparatus of a synchronous reluctance motor according to claim 1, wherein the torque current correction unit further includes a torque fluctuation detecting unit that detects temporal fluctuation of the load torque generated by the load element, and the torque current correction unit changes over a correction operation for the torque current command so as to conduct a correction of the torque current command when the torque fluctuation detected by the torque fluctuation detecting unit is larger than a predetermined value, and not to conduct the correction of the torque current command when the detected torque fluctuation is not larger than the predetermined value.

5. The motor control apparatus of a synchronous reluctance motor according to claim 4, wherein the torque fluctuation detecting unit detects the torque fluctuation on the basis of the error of the estimated rotating speed in preceding and succeeding cycles consecutive in time.

6. The motor control apparatus of a synchronous reluctance motor according to claim 4, wherein the torque current correction unit has a grace period to change over conduct and non-conduct of the correction operation of the torque current command, and during the grace period changes the torque current command gradually to be closer to the value obtained as the value after changeover.

7. The motor control apparatus of a synchronous reluctance motor according to claim 1, wherein the speed control unit includes an average calculation unit that averages temporally the estimated values of the rotating speed from the position and speed estimation unit when the torque current command is corrected, and a command generating unit that generates the current command to be supplied to the stator winding of the synchronous reluctance motor so as to eliminate the error of the obtained average and the target value of the rotating speed.

8. The motor control apparatus of a synchronous reluctance motor according to claim 7, wherein the average calculation unit outputs the average of estimated rotating speeds while a correction operation to the torque current command is conducted, and outputs the estimated value of the rotating speed from the position and speed estimation unit while a correction operation to the torque current command is not conducted, and the average calculation unit has a grace period to change over conduct and non-conduct of the correction operation of the torque current command, and during the grace period changes it's output gradually to be closer to the value obtained as the value after changeover.

9. The motor control apparatus of a synchronous reluctance motor according to claim 1, wherein the current control unit performs a coordinate transformation from two-phase current command to three-phase current command about the torque current command or the corrected torque current command and the field current command to generate a voltage command so as to eliminate a current error of the three-phase current command and the detected motor current.

10. The motor control apparatus of a synchronous reluctance motor according to claim 1, wherein the position and speed estimation unit includes an induced voltage estimation unit that estimates an induced voltage of the synchronous reluctance motor on the basis of the detected motor current from the current detector and the voltage command, an induced voltage generating unit that has a motor model of the synchronous reluctance motor in its inside and generates an induced voltage from the motor model, and a position error correction unit that corrects the estimated induced value so as to eliminate the voltage error of the estimated induced voltage from the induced voltage estimation unit and the induced voltage from the induced voltage generating unit.

11. The motor control apparatus of a synchronous reluctance motor according to claim 10, wherein the induced voltage estimation unit includes a motor constant compensation unit that compensates the motor constant of the synchronous reluctance motor by using the estimated rotating speed, the voltage command, and the detected motor current.

12. The motor control apparatus of a synchronous reluctance motor according to claim 11, wherein the motor constant compensation unit compensates the motor constant when the estimated rotating speed is larger than a reference value.

13. The motor control apparatus of a synchronous reluctance motor according to claim 12, wherein the motor constant compensation unit has a grace period to change over conduct and non-conduct of the compensation operation of the motor constant, and during the grace period changes the motor constant gradually to be closer to the value obtained as the value after changeover.

14. The motor control apparatus of a synchronous reluctance motor according to claim 11, further comprising a torque fluctuation detecting unit that detects temporal fluctuation of the load torque generated by the load element, wherein the motor constant compensation unit compensates the motor constant when the torque fluctuation from the torque fluctuation detecting unit is not larger than a reference value.

15. The motor control apparatus of a synchronous reluctance motor according to claim 14, wherein the motor constant compensation unit has a grace period to change over conduct and non-conduct of the compensation operation of the motor constant, and during the grace period changes the motor constant gradually to be closer to the value obtained as the value after changeover.

16. The motor control apparatus of a synchronous reluctance motor according to claim 1, further comprising a voltage saturation recognition unit that calculates a voltage saturation rate showing the degree of voltage saturation from the voltage command of the synchronous reluctance motor, and compares the voltage saturation rate with a predetermined value to output the comparison result, wherein the speed control unit lowers the target value of the rotating speed given from outside when the voltage saturation rate is above the predetermined value on the basis of the output from the voltage saturation recognition unit, and determines the current command based on the lowered value.

17. The motor control apparatus of a synchronous reluctance motor according to claim 1, further comprising:

a DC voltage detector that detects a direct-current voltage which is an input voltage to an inverter for supplying an alternating-current voltage to drive the synchronous reluctance motor, a motor voltage correction unit that corrects the motor voltage command so as to cancel pulsations of the direct-current voltage, and a voltage saturation recognition unit that calculates the voltage saturation rate showing the degree of voltage saturation from the motor correction voltage command, compares the calculated voltage saturation rate with a predetermined value, and outputs the comparison result, wherein the voltage saturation recognition unit corrects the predetermined value based on the pulsations of the direct-current voltage detected by the DC voltage detector, and the speed control unit lowers the target value of the rotating speed given from outside when the calculated voltage saturation rate is above the predetermined value, on the basis of the output from the voltage saturation recognition unit, and determines the current command on the basis of the lowered value.

18. The motor control apparatus of a synchronous reluctance motor according to claim 1, wherein the rotor of the synchronous reluctance motor includes a permanent magnet.

19. The motor control apparatus of a synchronous reluctance motor according to claim 18, wherein the permanent magnet has only an amount of magnet of minimum limit required for canceling the brake torque at the rated load of the synchronous reluctance motor.

20. The motor control apparatus of a synchronous reluctance motor according to claim 1, wherein the stator of the synchronous reluctance motor is a concentrated winding stator.

21. The motor control apparatus of a synchronous reluctance motor according claim 1, wherein the load element of the synchronous reluctance motor is at least rotary compressor or scroll compressor.

* * * * *